United States Patent
Kubo

(10) Patent No.: US 10,161,753 B2
(45) Date of Patent: Dec. 25, 2018

(54) IN-VEHICLE APPARATUS AND MAP DATA MANAGEMENT SYSTEM

(71) Applicant: CLARION CO., LTD., Saitama (JP)

(72) Inventor: Atsushi Kubo, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/523,581

(22) PCT Filed: Oct. 8, 2015

(86) PCT No.: PCT/JP2015/078592
§ 371 (c)(1),
(2) Date: May 1, 2017

(87) PCT Pub. No.: WO2016/092948
PCT Pub. Date: Jun. 16, 2016

(65) Prior Publication Data
US 2017/0307383 A1 Oct. 26, 2017

(30) Foreign Application Priority Data

Dec. 8, 2014 (JP) .................................. 2014-247948
Dec. 8, 2014 (JP) .................................. 2014-248059

(51) Int. Cl.
*G01C 21/26* (2006.01)
*G06F 13/00* (2006.01)
(Continued)

(52) U.S. Cl.
CPC ............. *G01C 21/26* (2013.01); *G06F 13/00* (2013.01); *G06F 17/3007* (2013.01); *G06F 17/30241* (2013.01); *G09B 29/10* (2013.01)

(58) Field of Classification Search
CPC ................. G01C 21/26; G06F 17/3007; G06F 17/30241
See application file for complete search history.

(56) References Cited

U.S. PATENT DOCUMENTS

2007/0168121 A1 7/2007 Adachi
2009/0088963 A1* 4/2009 Horiguchi .............. G01C 21/26
701/532
(Continued)

FOREIGN PATENT DOCUMENTS

JP 2002-358004 A1 12/2002
JP 3648206 B2 2/2005
(Continued)

OTHER PUBLICATIONS

International Search Report issued for corresponding PCT/JP2015/078592 application.
(Continued)

*Primary Examiner* — Michael D Lang
(74) *Attorney, Agent, or Firm* — IP Business Solution, LLC

(57) ABSTRACT

An in-vehicle apparatus and a map data management system are provided that can appropriately update a map. The in-vehicle apparatus 3 includes a storage unit 16 that stores parcel data PD constituted by a plurality of files in accordance with meshes of the map, and a control unit 10 that, when a vehicle 2 enters a single mesh of the map, updates the version of lower-level parcel files DPF corresponding to meshes at the periphery of the single mesh.

9 Claims, 18 Drawing Sheets

(51) Int. Cl.
*G09B 29/10* (2006.01)
*G06F 17/30* (2006.01)

(56) References Cited

U.S. PATENT DOCUMENTS

| | | | |
|---|---|---|---|
| 2011/0202274 A1 | 8/2011 | Akikawa et al. | |
| 2013/0080054 A1 | 3/2013 | Kutomi | |
| 2013/0131978 A1* | 5/2013 | Han | G01C 21/3638 701/436 |

FOREIGN PATENT DOCUMENTS

| | | | |
|---|---|---|---|
| JP | 2009-092502 A | 4/2009 |
| JP | 2009-128162 A | 6/2009 |
| JP | 2011-169953 A | 9/2011 |
| JP | 5225380 B2 | 3/2013 |
| JP | 2013-068916 A | 4/2013 |
| JP | 2013-254099 A | 12/2013 |
| WO | 2005/101350 A1 | 10/2005 |
| WO | 2010/007689 A1 | 1/2010 |

OTHER PUBLICATIONS

Written Opinion of the International Search Authority issued for corresponding PCT/JP2015/078592 application.
International Preliminary Report on Patentability issued for corresponding PCT/JP2015/078592.
Written Opinion of the International Searching Authority issued for corresponding PCT/JP2015/078592.
Extended European Search Report mailed by the European Patent Office dated Apr. 26, 2018 in the corresponding European patent application No. 15866863.2-1222.
Notice of Reasons for Refusal mailed by the Japan Patent Office dated Oct. 2, 2018 corresponding to Japanese Patent Application No. 2014-248059A.

* cited by examiner

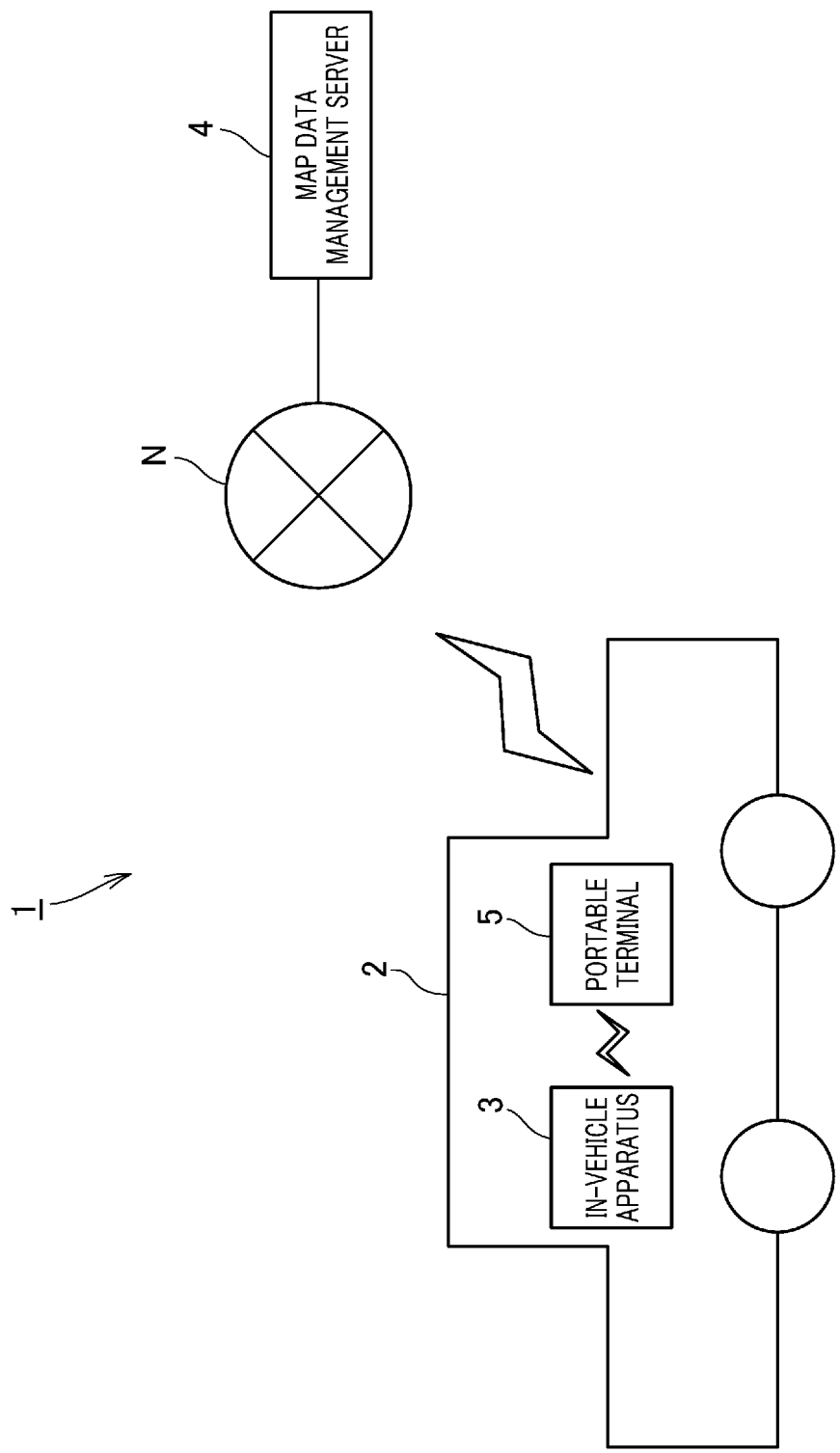

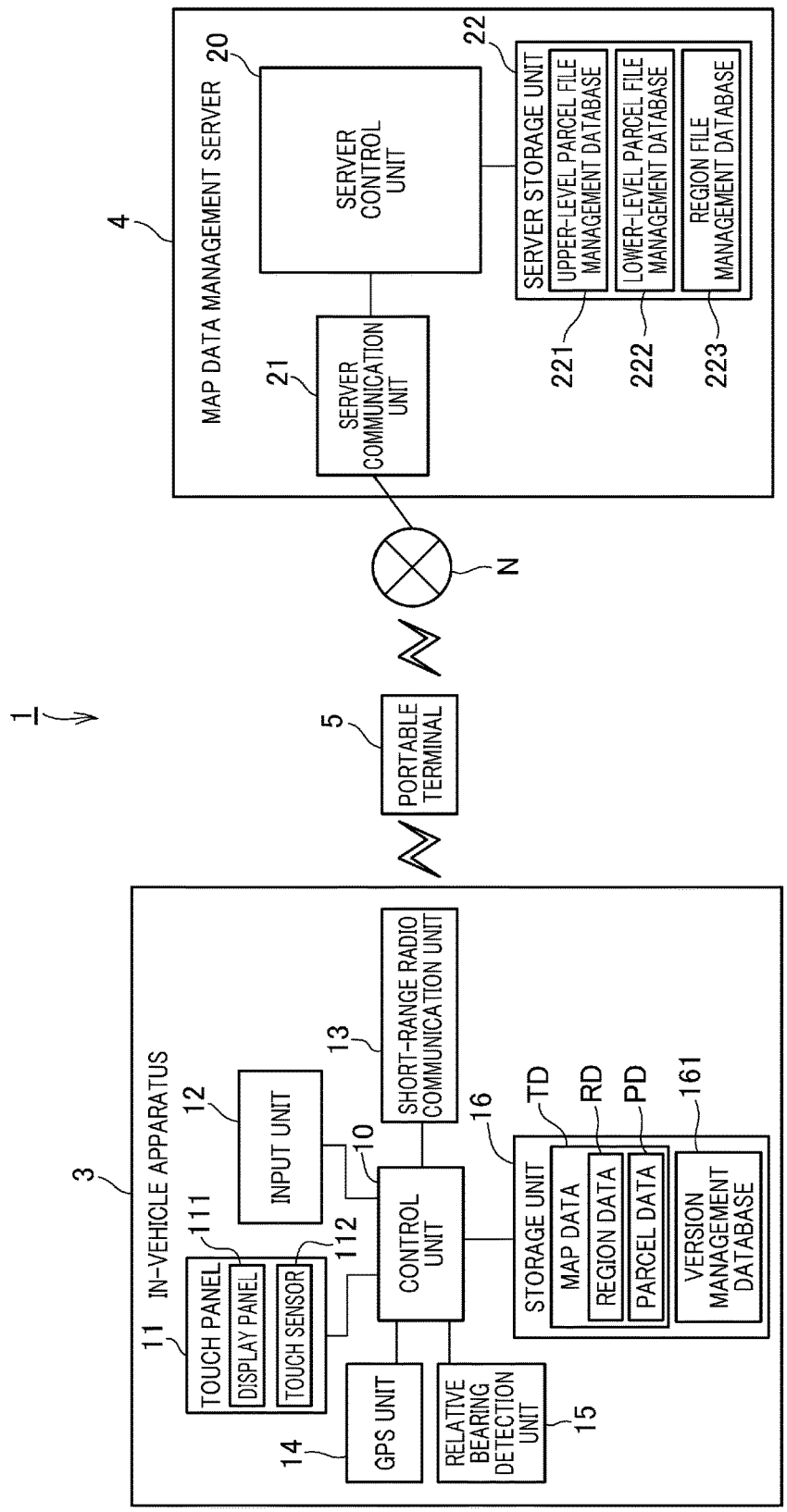

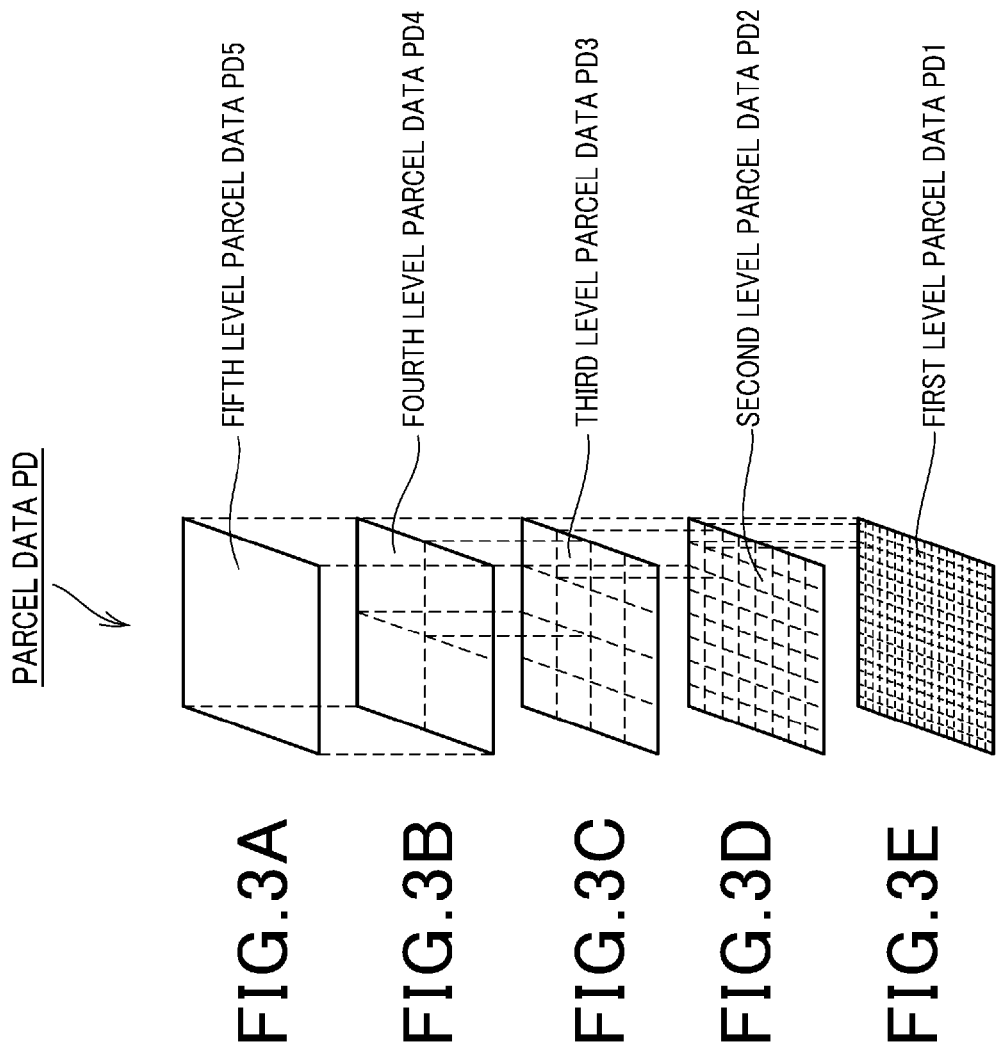

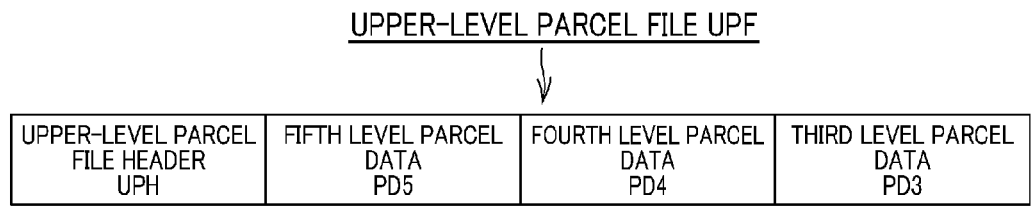
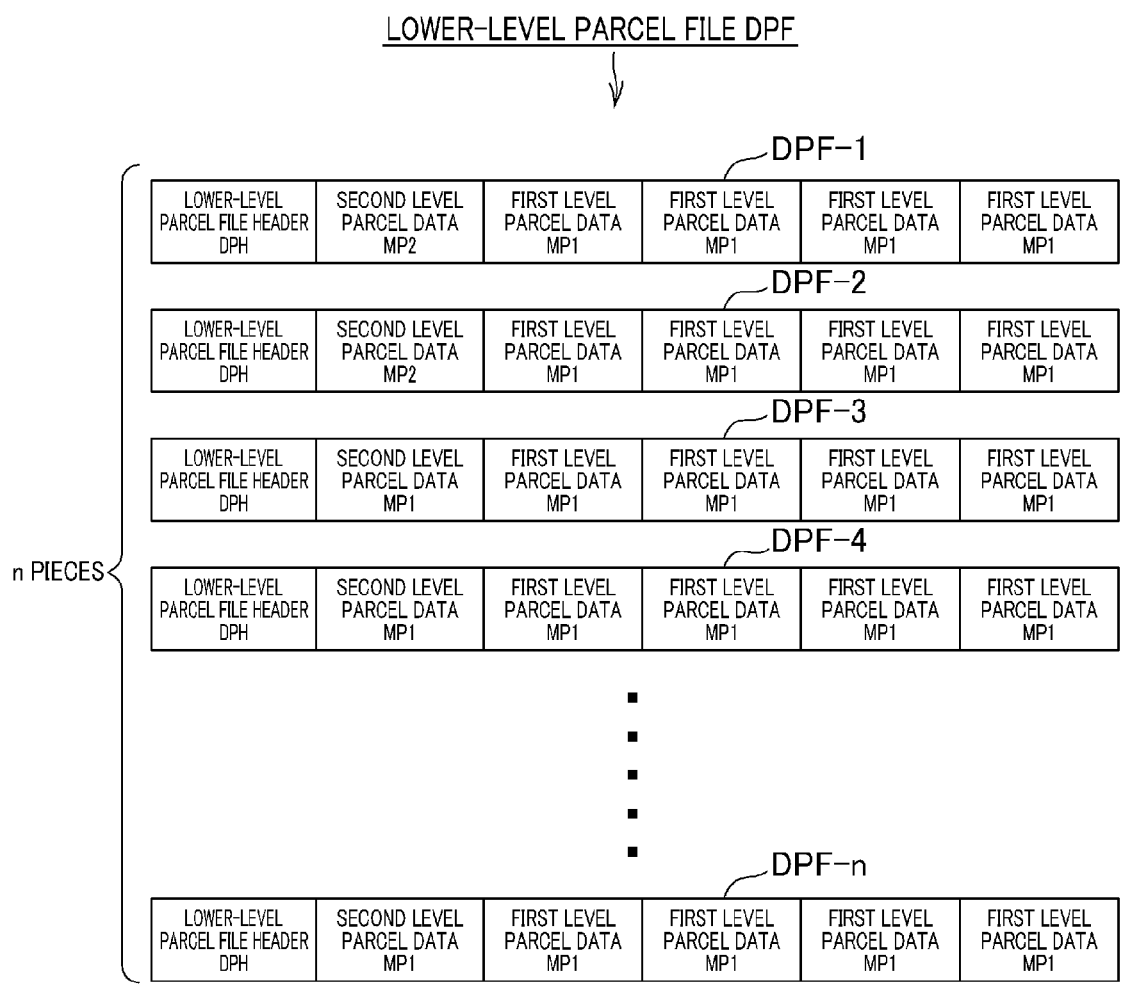

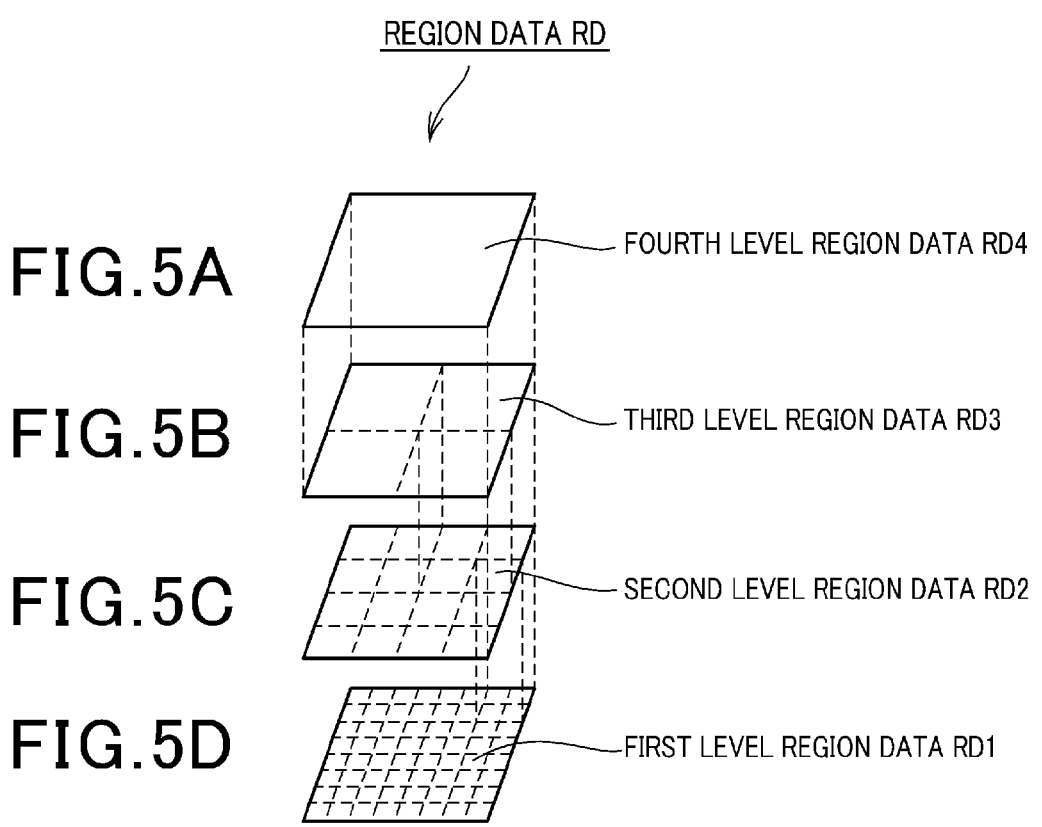

FIG.6

REGION FILE RF

| REGION FILE HEADER RH | FOURTH LEVEL REGION DATA RD4 | THIRD LEVEL REGION DATA RD3 | SECOND LEVEL REGION DATA RD2 | FIRST LEVEL REGION DATA RD1 |

FIG.7

| FILE | NUMBER OF FILES |
| --- | --- |
| UPPER-LEVEL PARCEL FILE | 1 |
| LOWER-LEVEL PARCEL FILE | NUMBER OF PIECES OF SECOND LEVEL MESH PARCEL DATA |
| REGION FILE | 1 |

FIG.8A

| INTEGRATED VERSION | UPPER-LEVEL PARCEL FILE UPF VERSION | VERSION OF LOWER-LEVEL PARCEL FILE DPF-1 | VERSION OF LOWER-LEVEL PARCEL FILE DPF-2 | ... | VERSION OF LOWER-LEVEL PARCEL FILE DPF-n | VERSION OF REGION FILE RF |
|---|---|---|---|---|---|---|
| ver1.0 | ver1.0 | ver1.0 | ver1.0 | ... | ver1.0 | ver1.0 |

FIG.8B

| INTEGRATED VERSION | UPPER-LEVEL PARCEL FILE UPF VERSION | VERSION OF LOWER-LEVEL PARCEL FILE DPF-1 | VERSION OF LOWER-LEVEL PARCEL FILE DPF-2 | ... | VERSION OF LOWER-LEVEL PARCEL FILE DPF-n | VERSION OF REGION FILE RF |
|---|---|---|---|---|---|---|
| ver1.1 | ver1.1 | ver1.1 | ver1.1 | ... | ver1.1 | ver1.1 |

FIG.8C

| INTEGRATED VERSION | UPPER-LEVEL PARCEL FILE UPF VERSION | VERSION OF LOWER-LEVEL PARCEL FILE DPF-1 | VERSION OF LOWER-LEVEL PARCEL FILE DPF-2 | ... | VERSION OF LOWER-LEVEL PARCEL FILE DPF-n | VERSION OF REGION FILE RF |
|---|---|---|---|---|---|---|
| ver1.2 | ver1.2 | ver1.2 | ver1.2 | ... | ver1.2 | ver1.2 |

FIG.9A

Table 221:

| UPPER-LEVEL PARCEL FILE IDENTIFICATION INFORMATION (FA1) | UPPER-LEVEL PARCEL FILE UPF (ACTUAL DATA) (FA2) | UPPER-LEVEL PARCEL VERSION INFORMATION (FA3) | UPPER-LEVEL PARCEL DIFFERENCE DATA (FA4) |
|---|---|---|---|
| UPF000001 | UPPER-LEVEL PARCEL FILE UPF (ver1.2) | ver1.2 | UPPER-LEVEL PARCEL DIFFERENCE DATA (ver1.2-1.1) |
| UPF000001 | UPPER-LEVEL PARCEL FILE UPF (ver1.1) | ver1.1 | UPPER-LEVEL PARCEL DIFFERENCE DATA (ver1.1-1.0) |
| UPF000001 | UPPER-LEVEL PARCEL FILE UPF (ver1.0) | ver1.0 | - |

FIG.9B

Table 222:

222-1:

| LOWER-LEVEL PARCEL FILE IDENTIFICATION INFORMATION (FB1) | LOWER-LEVEL PARCEL FILE DPF-1 (ACTUAL DATA) (FB2) | LOWER-LEVEL PARCEL VERSION INFORMATION (FB3) | LOWER-LEVEL PARCEL DIFFERENCE DATA (FB4) |
|---|---|---|---|
| DPF000001 | LOWER-LEVEL PARCEL FILE DPF-1 (ver1.2) | ver1.2 | LOWER-LEVEL PARCEL DIFFERENCE DATA (ver1.2-1.1) |
| DPF000001 | LOWER-LEVEL PARCEL FILE DPF-1 (ver1.1) | ver1.1 | LOWER-LEVEL PARCEL DIFFERENCE DATA (ver1.1-1.0) |
| DPF000001 | LOWER-LEVEL PARCEL FILE DPF-1 (ver1.0) | ver1.0 | - |

222-2:

| LOWER-LEVEL PARCEL FILE IDENTIFICATION INFORMATION | LOWER-LEVEL PARCEL FILE DPF-2 (ACTUAL DATA) | LOWER-LEVEL PARCEL VERSION INFORMATION | LOWER-LEVEL PARCEL DIFFERENCE DATA |
|---|---|---|---|
| DPF000002 | LOWER-LEVEL PARCEL FILE DPF-2 (ver1.2) | ver1.2 | LOWER-LEVEL PARCEL DIFFERENCE DATA (ver1.2-1.1) |
| DPF000002 | LOWER-LEVEL PARCEL FILE DPF-2 (ver1.1) | ver1.1 | LOWER-LEVEL PARCEL DIFFERENCE DATA (ver1.1-1.0) |
| DPF000002 | LOWER-LEVEL PARCEL FILE DPF-2 (ver1.0) | ver1.0 | - |

222-3:

| LOWER-LEVEL PARCEL FILE IDENTIFICATION INFORMATION | LOWER-LEVEL PARCEL FILE DPF-3 (ACTUAL DATA) | LOWER-LEVEL PARCEL VERSION INFORMATION | LOWER-LEVEL PARCEL DIFFERENCE DATA |
|---|---|---|---|
| DPF000003 | LOWER-LEVEL PARCEL FILE DPF-3 (ver1.2) | ver1.2 | LOWER-LEVEL PARCEL DIFFERENCE DATA (ver1.2-1.1) |
| DPF000003 | LOWER-LEVEL PARCEL FILE DPF-3 (ver1.1) | ver1.1 | LOWER-LEVEL PARCEL DIFFERENCE DATA (ver1.1-1.0) |
| DPF000003 | LOWER-LEVEL PARCEL FILE DPF-3 (ver1.0) | ver1.0 | - |

⋮

222-n:

| LOWER-LEVEL PARCEL FILE IDENTIFICATION INFORMATION | LOWER-LEVEL PARCEL FILE DPF-n (ACTUAL DATA) | LOWER-LEVEL PARCEL VERSION INFORMATION | LOWER-LEVEL PARCEL DIFFERENCE DATA |
|---|---|---|---|
| DPF999999 | LOWER-LEVEL PARCEL FILE DPF-n (ver1.2) | ver1.2 | LOWER-LEVEL PARCEL DIFFERENCE DATA (ver1.2-1.1) |
| DPF999999 | LOWER-LEVEL PARCEL FILE DPF-n (ver1.1) | ver1.1 | LOWER-LEVEL PARCEL DIFFERENCE DATA (ver1.1-1.0) |
| DPF999999 | LOWER-LEVEL PARCEL FILE DPF-n (ver1.0) | ver1.0 | - |

FIG.9C

Table 223:

| REGION FILE IDENTIFICATION INFORMATION (FC1) | REGION FILE RF (ACTUAL DATA) (FC2) | REGION FILE VERSION INFORMATION (FC3) | REGION FILE DIFFERENCE DATA (FC4) |
|---|---|---|---|
| RF000001 | REGION FILE RF (ver1.2) | ver1.2 | REGION FILE DIFFERENCE DATA (ver1.2-1.1) |
| RF000001 | REGION FILE RF (ver1.1) | ver1.1 | REGION FILE DIFFERENCE DATA (ver1.1-1.0) |
| RF000001 | REGION FILE RF (ver1.0) | ver1.0 | - |

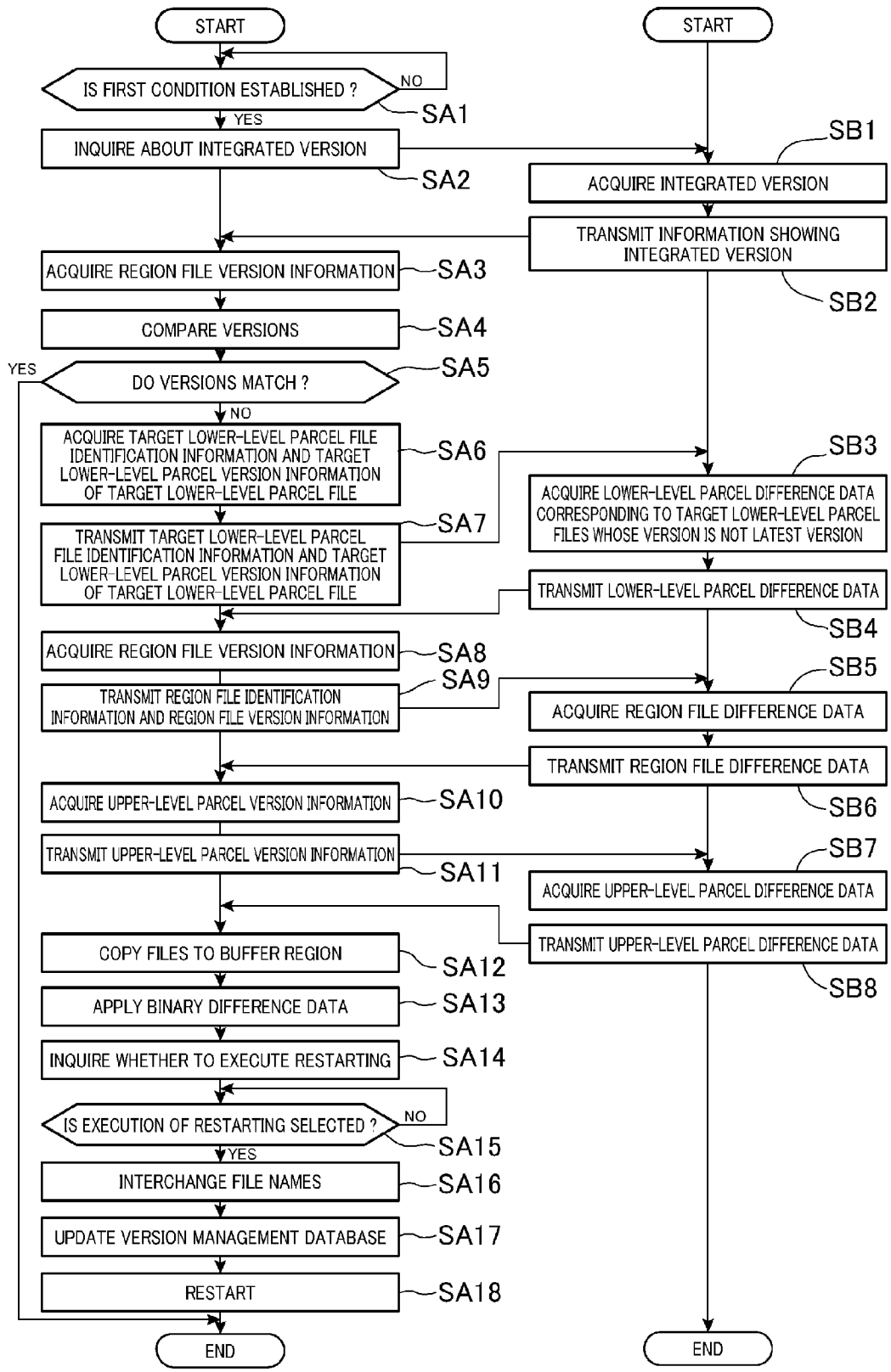

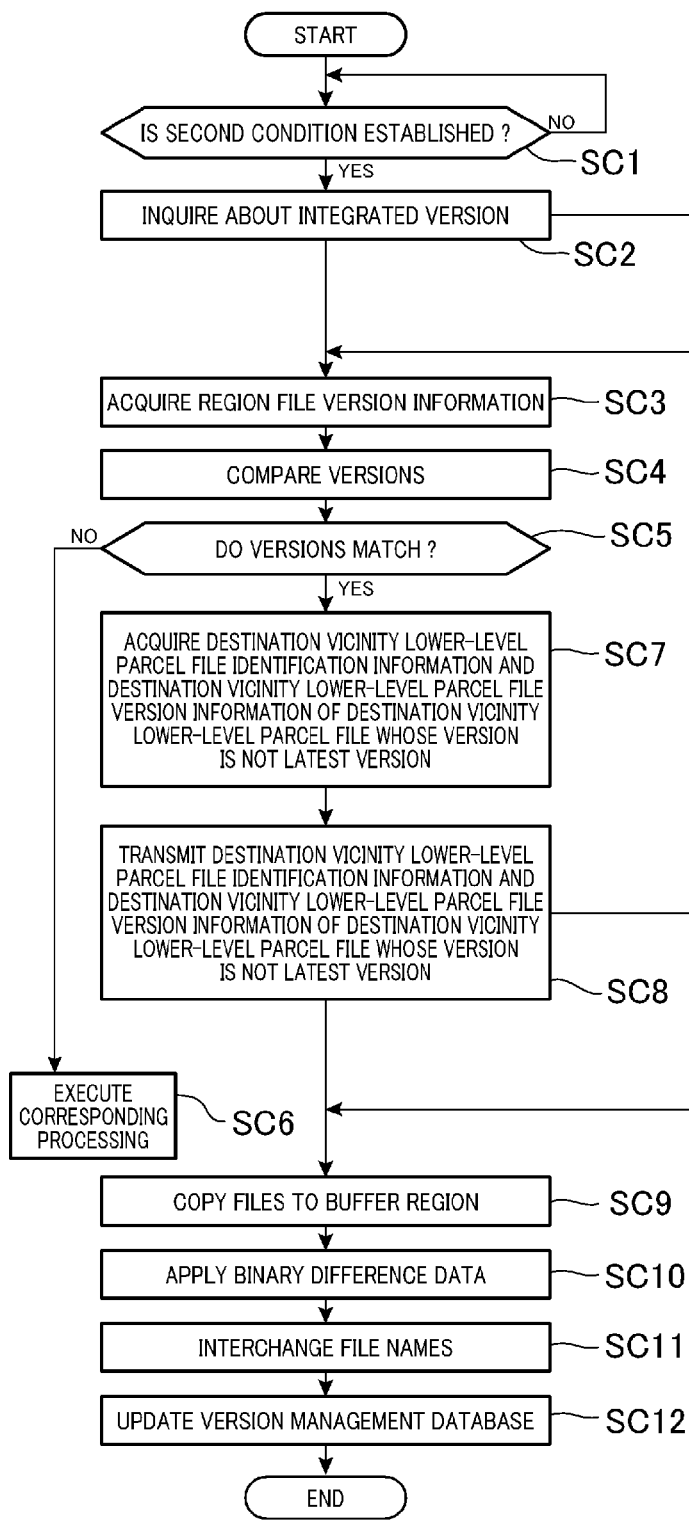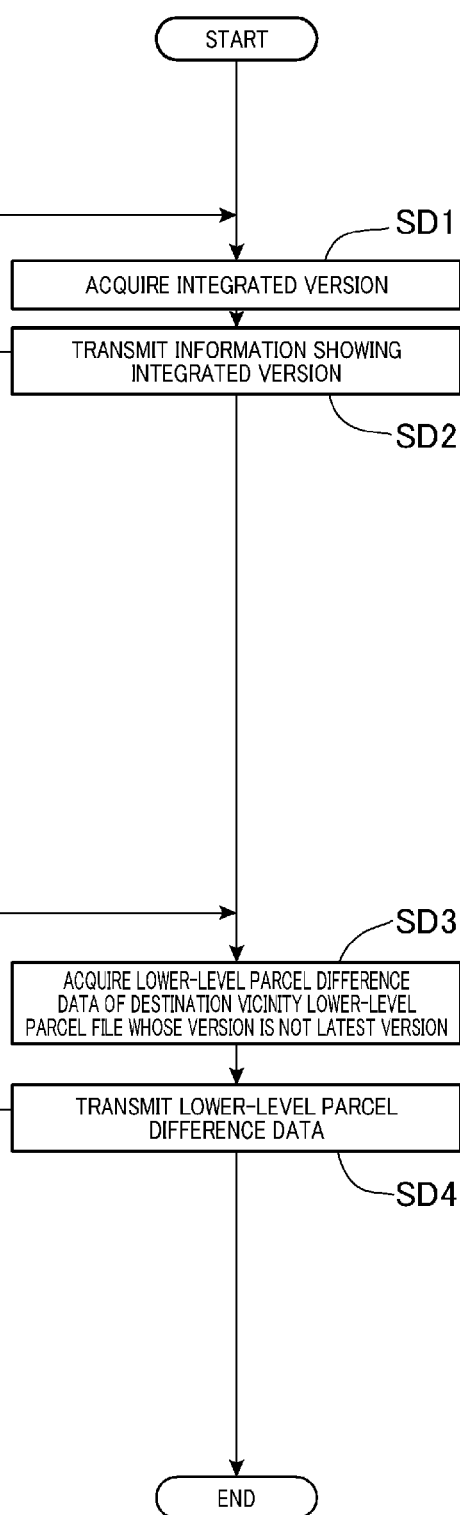

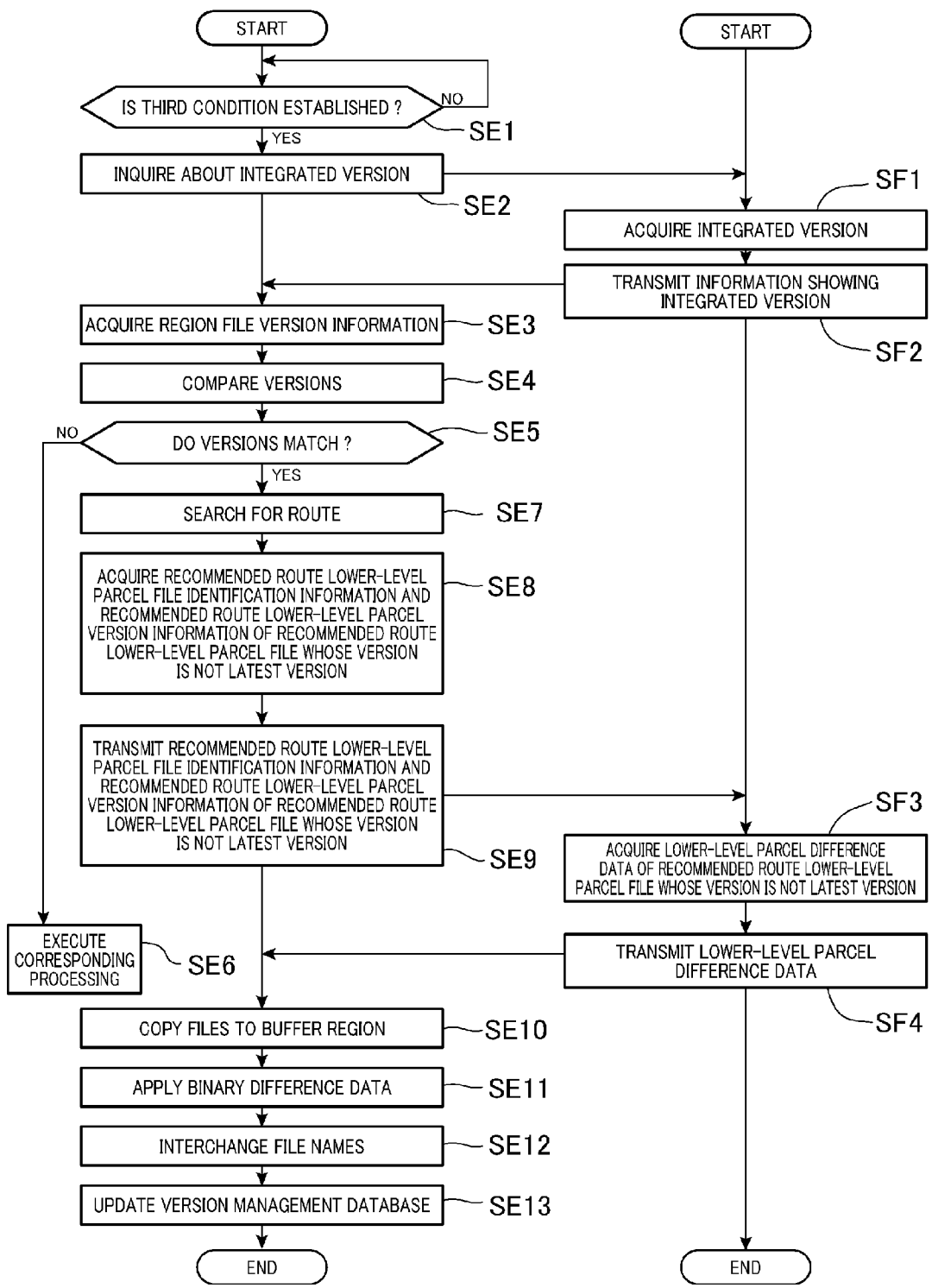

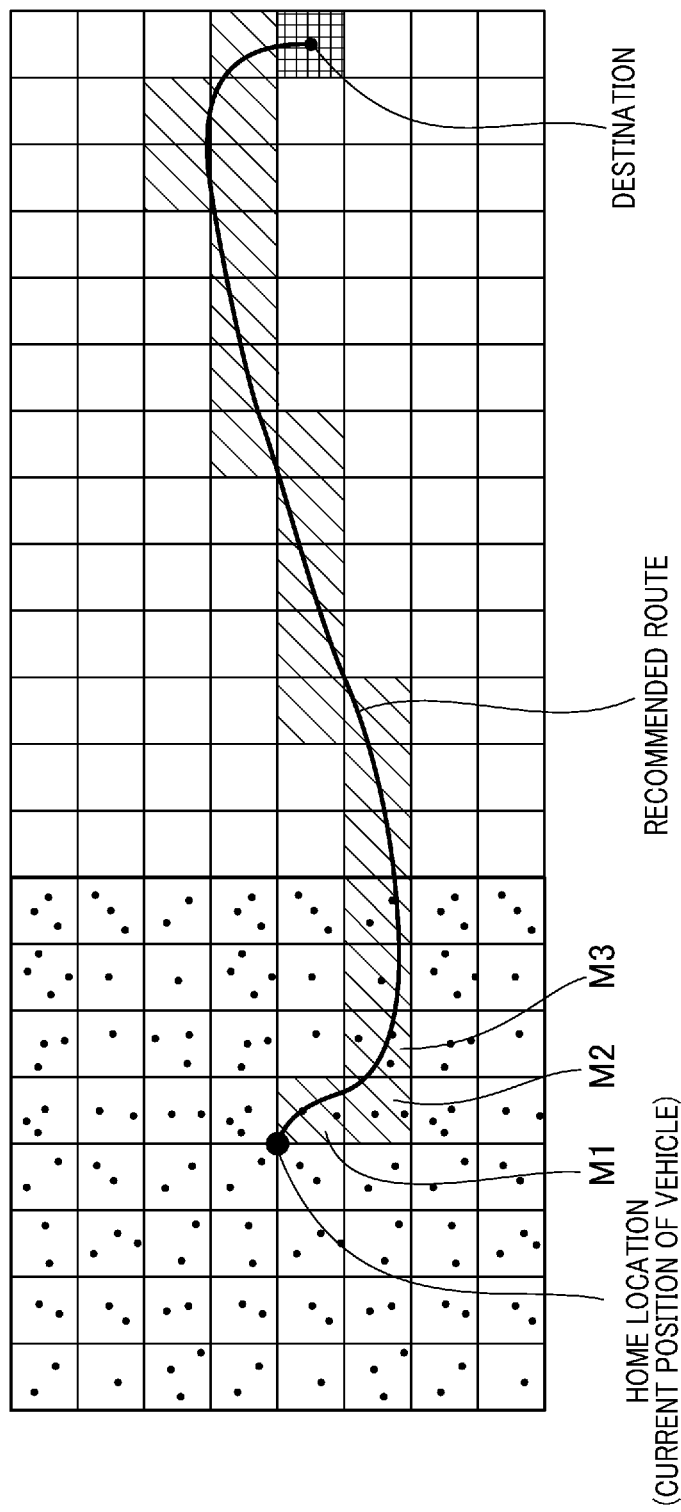

▶ ··· CURRENT POSITION OF VEHICLE

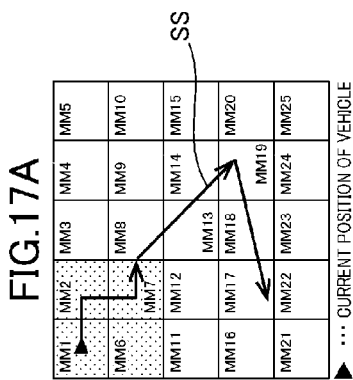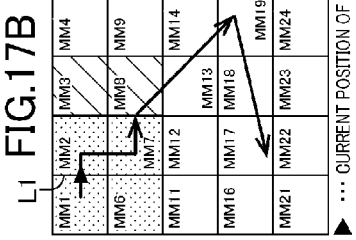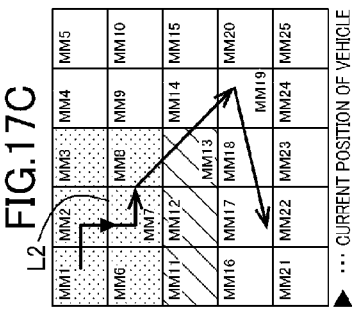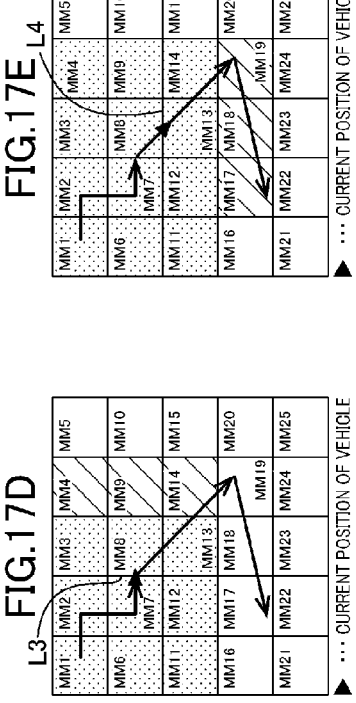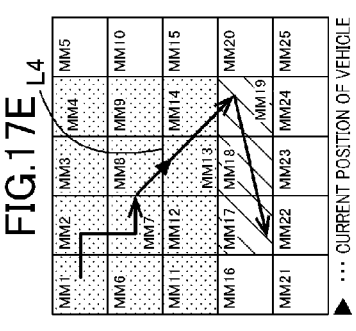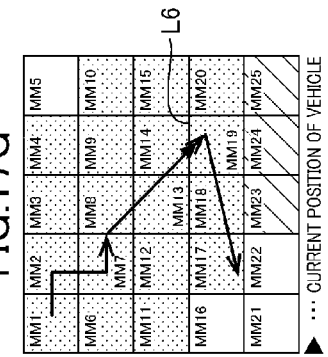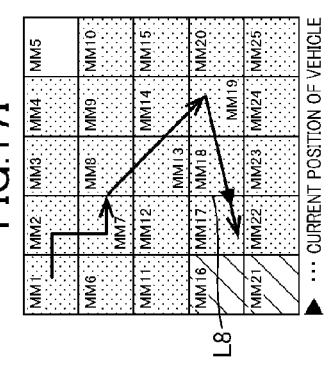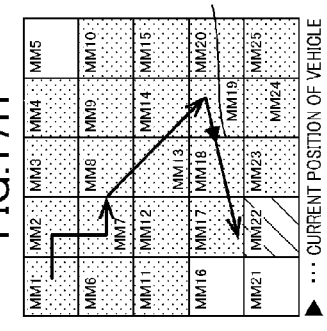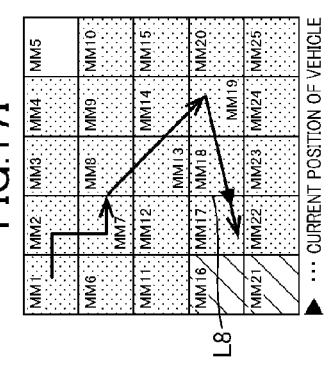

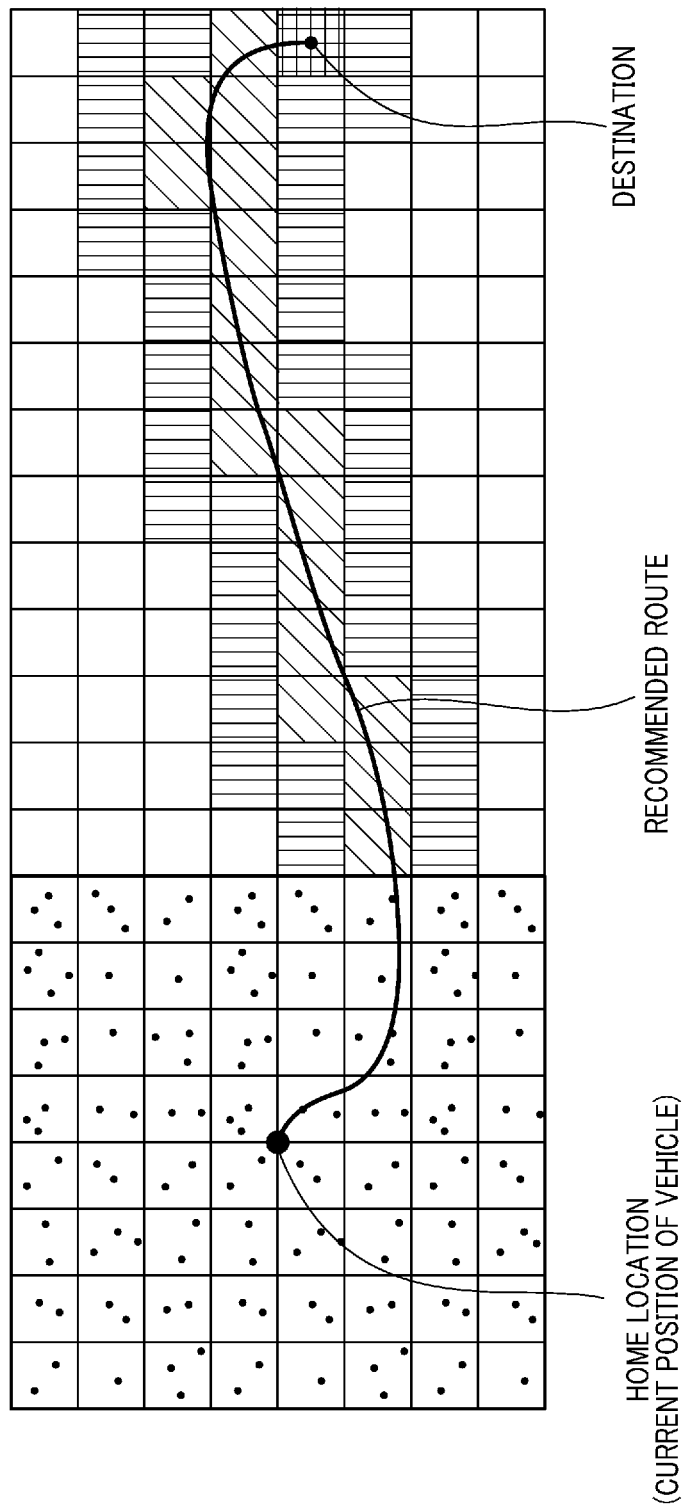

IN-VEHICLE APPARATUS AND MAP DATA MANAGEMENT SYSTEM

TECHNICAL FIELD

The present invention relates to an in-vehicle apparatus and a map data management system.

BACKGROUND ART

The background art of the present technical field includes technology disclosed in International Publication No. WO 2010/007689 (Patent Literature 1). The aforementioned gazette includes the description "A map data updating system (200) includes a recording unit (201), an acquiring unit (202) and an updating unit (203). The recording unit (201) records map data which has parcel data that is used for rendering and region data that is used for route calculation, and is constituted by mesh units that are divided into predetermined areas for each of a plurality of different contraction scales and form a hierarchical structure. The acquiring unit (202) acquires the up-to date parcel data and region data in which a change location is included for each hierarchical level. The updating unit (203) updates, in mesh units, the parcel data and region data recorded in the recording unit (201), using the up-to date parcel data and region data for each hierarchical level that is acquired by the acquiring unit (202)".

CITATION LIST

Patent Literature

Patent Literature 1: International Publication No. WO 2010/007689

SUMMARY OF INVENTION

Technical Problem

However, for example, from the viewpoint of improving the accuracy of a map or improving convenience for a user, it is required to update maps more appropriately. Therefore, an object of the present invention is to provide an in-vehicle apparatus and a map data management system that can appropriately update a map.

Solution to Problem

To achieve the aforementioned object, an in-vehicle apparatus that is mounted in a vehicle includes: a storage unit that stores parcel data constituted by a plurality of files in accordance with meshes of a map; and a control unit that, in a case where the vehicle enters one mesh of a map, updates a file corresponding to a mesh at a periphery of the one mesh.

Advantageous Effects of Invention

According to the present invention, an in-vehicle apparatus and a map data management system that can appropriately update a map can be provided.

BRIEF DESCRIPTION OF DRAWINGS

FIG. 1 is a view illustrating the configuration of a map data management system according to an embodiment of the present invention.

FIG. 2 is a block diagram illustrating the functional configuration of an in-vehicle apparatus and a map data management server.

FIGS. 3A to 3F are views illustrating parcel data.

FIG. 4A is a view illustrating an upper-level parcel file, and FIG. 4B is a view illustrating a lower-level parcel file.

FIGS. 5A to 5D are views illustrating region data.

FIG. 6 is a view illustrating a region file.

FIG. 7 is a view illustrating the number of files that constitute parcel data and region data.

FIGS. 8A to 8C are views that are utilized to describe updating of versions of files in the map data management server.

FIG. 9A is a view illustrating an upper-level parcel file management database, FIG. 9B is a view illustrating a lower-level parcel file management database, and FIG. 9C is a view illustrating a region file management database.

FIGS. 10A and 10B are flowcharts illustrating operations of the in-vehicle apparatus and the map data management server, respectively.

FIGS. 12A and 12B are flowcharts illustrating operations of the in-vehicle apparatus and the map data management server, respectively.

FIGS. 13A and 13B are flowcharts illustrating operations of the in-vehicle apparatus and the map data management server, respectively.

FIG. 14 is a view which shows meshes on a map at a scale factor of parcel scale factor level PLV2, and also displays a current position, a destination, and a recommended route of a vehicle.

FIGS. 17A to 17I are views in which meshes and a current position of a vehicle are displayed on a map at parcel scale factor level PLV2.

FIG. 18 is a view which shows meshes on a map at a scale factor of parcel scale factor level PLV2, and also displays a current position, a destination, and a recommended route of a vehicle.

DESCRIPTION OF EMBODIMENT

Figure 11:
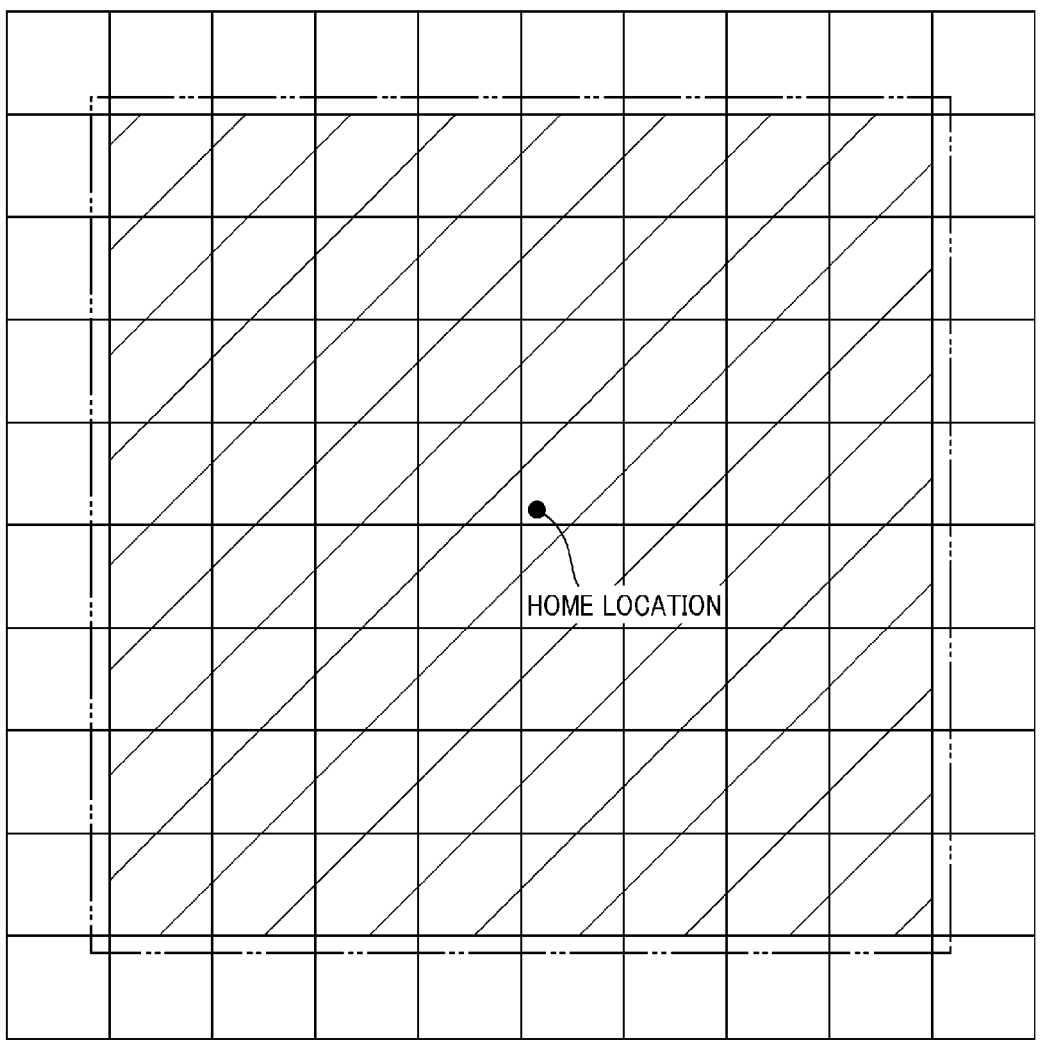
FIG. 11 is a view in which a registered home location and meshes are displayed on a map at a parcel scale factor level PLV2.

FIG. 1 is a view illustrating the configuration of a map data management system 1 according to the present embodiment.

As illustrated in FIG. 1, the map data management system 1 includes an in-vehicle apparatus 3 that is mounted in a vehicle 2, and a map data management server 4 (information processing apparatus) that is connected to a network N constituted by including a communication network such as the Internet or a telephone network.

A portable terminal 5 that a user riding in the vehicle 2 possesses is connected by short-range radio communication such as Bluetooth (registered trademark) to the in-vehicle apparatus 3. The portable terminal 5 has a function that is configured to access the network N. The in-vehicle apparatus 3 accesses the network N through the portable terminal 5 and thereby communicates with the map data management server 4. Any terminal equipped with a function configured to communicate with the in-vehicle apparatus 3 and a function configured to access the network N can be used as the portable terminal 5, and examples thereof include a mobile phone such as a smartphone, or a tablet-type computer.

The in-vehicle apparatus 3 stores map data TD that includes parcel data PD and region data RD which are described in detail later. Based on the map data TD, the in-vehicle apparatus 3 performs operations to display a map (hereunder referred to as "map displaying"), search for a route to a destination (hereunder referred to as "route searching"), and provide guidance with respect to a retrieved rote (hereunder referred to as "route guidance"). Further, the in-vehicle apparatus 3 communicates with the map data management server 4 and, by a method that is described in detail later, updates the versions of the parcel data PD and the region data RD.

FIG. 2 is a block diagram illustrating the functional configuration of each apparatus that the map data management system 1 is equipped with.

As illustrated in FIG. 2, the in-vehicle apparatus 3 includes a control unit 10, a touch panel 11, an input unit 12, a short-range radio communication unit 13, a GPS unit 14, a relative bearing detection unit 15 and a storage unit 16.

The control unit 10 includes a CPU, a ROM, a RAM, and other peripheral circuits and the like, and controls the respective units of the in-vehicle apparatus 3.

The touch panel 11 includes a display panel 111 and a touch sensor 112. The display panel 111 is constituted by a liquid crystal display or the like, and displays images in accordance with control of the control unit 10. The touch sensor 112 is disposed in a superimposed manner on the display panel 111, and detects a touch operation of a user, and outputs a signal that is based on the touch operation to the control unit 10. The control unit 10 executes processing corresponding to touch operations based on signals that are input from the touch sensor 112.

The input unit 12 includes a plurality of operation switches that are provided in a housing of the in-vehicle apparatus 3, and detects operations with respect to the operation switches and outputs signals based on the operations with respect to the operation switches to the control unit 10. The control unit 10 executes processing corresponding to operations with respect to the operation switches, based on signals that are input from the input unit 12.

In accordance with control by the control unit 10, the short-range radio communication unit 13 establishes a communication link with the portable terminal 5 according to a predetermined communication standard with respect to short-range radio communication, and performs radio communication with the portable terminal 5 in accordance with the relevant standard.

The GPS unit 14 receives GPS radio waves via an unshown GPS antenna, acquires position coordinates and a travelling direction that indicate a current position of the vehicle 2 from a GPS signal that is superimposed on the GPS radio waves, and outputs the position coordinates and travelling direction to the control unit 10.

The relative bearing detection unit 15 includes a gyro sensor and an acceleration sensor. The gyro sensor is constituted by, for example, a vibration gyro, and detects the relative bearing of the vehicle 2. The acceleration sensor detects acceleration acting on the vehicle 2. The relative bearing detection unit 15 outputs the detection results of the gyro sensor and the acceleration sensor to the control unit 10.

The control unit 10 detects the current position of the vehicle 2 based on the position coordinates and travelling direction inputted from the GPS unit 14, the detection results inputted from the relative bearing detection unit 15, and the map data TD.

The storage unit 16 includes a nonvolatile memory, and stores various kinds of data. The storage unit 16 stores the map data TD and a version management database 161 (described later). The map data TD includes parcel data PD and region data RD. The parcel data PD is data that is used for map displaying and route guidance and the like. The region data RD is data that is used for route searching and the like. The parcel data PD and the region data RD will be described later.

The portable terminal 5 has a function that performs short-range radio communication with the in-vehicle apparatus 3, and a function that accesses the network N and communicates with the map data management server 4. The portable terminal 5 mediates the exchange of data between the in-vehicle apparatus 3 and the map data management server 4. A predetermined application is installed in the portable terminal 5, and data exchanges are mediated by a function of the predetermined application.

As illustrated in FIG. 2, the map data management server 4 includes a server control unit 20, a server communication unit 21 and a server storage unit 22.

The server control unit 20 includes a CPU, a ROM, a RAM, and other peripheral circuits and the like, and controls the respective units of the map data management server 4.

In accordance with control performed by the server control unit 20, the server communication unit 21 communicates according to a predetermined communication standard with an apparatus that is connected to the network N.

The server storage unit 22 stores an upper-level parcel file management database 221, a lower-level parcel file management database 222 and a region file management database 223. The data which the server storage unit 22 stores will be described later.

Note that, to facilitate understanding of the present invention, FIG. 2 is a schematic drawing in which the respective functional configurations of the in-vehicle apparatus 3 and the map data management server 4 are illustrated in a manner in which the functional configurations are classified according to the main processing contents thereof, and the functional configurations of these apparatuses can also be further classified into a greater number of constituent elements depending on the processing contents. Furthermore, the functional configurations may be classified so that one constituent element executes a greater amount of processing. Further, the processing of the respective constituent elements may be executed by a single piece of hardware or may be executed by multiple pieces of hardware. In addition, the processing of the respective constituent elements may be realized by a single program, of may be realized by a plurality of programs.

In the following description, in the control unit 10 and the server control unit 20, for example, the CPU executes processing by co-operation between hardware and software which read out and execute a predetermined program or the like.

Next, the parcel data PD and the region data RD that the in-vehicle apparatus 3 stores are described in detail.

<Description of Parcel Data PD>

FIGS. 3A to 3F are views that schematically illustrate the parcel data PD.

As illustrated in FIGS. 3A to 3F, the parcel data PD includes five types of data that correspond to five levels from a parcel scale factor level PLV1 to a parcel scale factor level PLV5. The five types of data are: first level parcel data PD1

(FIG. 3E), second level parcel data PD2 (FIG. 3D), third level parcel data PD3 (FIG. 3C), fourth level parcel data PD4 (FIG. 3B) and fifth level parcel data PD5 (FIG. 3A). Hereunder, the first level parcel data PD1 to fifth level parcel data PD5 are described as "level parcel data" when not making a distinction therebetween.

The term "parcel scale factor level" expresses the level of a scale factor using five levels, namely, the parcel scale factor level PLV1 to the parcel scale factor level PLV5. The parcel scale factor level PLV1 is the level at which the scale factor is largest (the most detailed level), and the parcel scale factor level PLV5 is the level at which the scale factor is smallest (the level of the widest area), and the level of the scale factor decreases in stages from the parcel scale factor level PLV1 towards the parcel scale factor level PLV5.

Each of the respective types of level parcel data includes rendering data for displaying a map that corresponds to a parcel scale factor level. The rendering data included in the level parcel data includes road rendering data that relates to rendering the shape of roads, background rendering data that relates to rendering a background such as geographical features, and character string rendering data that relates to rendering a character string such as an administrative district and the like. Based on one of the types of level parcel data, the control unit 10 displays a map at a scale factor that corresponds to the parcel scale factor level of the relevant one type of level parcel data on the display panel 111. For example, based on the fifth level parcel data PD5, the control unit 10 displays a map at a scale factor that corresponds to the parcel scale factor level PLV5 on the display panel 111.

From the viewpoint of shortening search time periods as well as memory efficiency and the like, the respective types of level parcel data are divided into units that are referred to as a "mesh" that correspond to a single rectangular region on a map (hereunder, the data of a mesh unit is referred to as "mesh data"). Each item of mesh data has rendering data for displaying a map of the corresponding mesh. Hereunder, mesh data of the first level parcel data PD1 is referred to as "first level mesh parcel data MP1", mesh data of the second level parcel data PD2 is referred to as "second level mesh parcel data MP2", mesh data of the third level parcel data PD3 is referred to as "third level mesh parcel data MP3", mesh data of the fourth level parcel data PD4 is referred to as "fourth level mesh parcel data MP4", and mesh data of the fifth level parcel data PD5 is referred to as "fifth level mesh parcel data MP5".

FIG. 3A to FIG. 3E each represent a piece of level parcel data that corresponds to a predetermined region on a map, and the respective pieces of level parcel data of the respective maps represent mesh data that constitutes the respective pieces of level parcel data. As illustrated in FIGS. 3A and 3B, a single piece of fifth level mesh parcel data MP5 corresponds to four pieces of fourth level mesh parcel data MP4. As illustrated in FIGS. 3(B) and (C), a single piece of fourth level mesh parcel data MP4 corresponds to four pieces of third level mesh parcel data MP3. As illustrated in FIGS. 3(C) and (D), a single piece of third level mesh parcel data MP3 corresponds to four pieces of second level mesh parcel data MP2.

FIG. 3F is a view illustrating a single piece of second level mesh parcel data MP2 and four pieces of first level mesh parcel data MP1 corresponding to the single piece of second level mesh parcel data MP2. As illustrated in FIGS. 3D, 3E and 3F, a single piece of second level mesh parcel data MP2 corresponds to four pieces of first level mesh parcel data MP1.

In the parcel data PD, the third level parcel data PD3 to the fifth level parcel data PD5 are constituted by an upper-level parcel file UPF that is a single file. In the present embodiment, the term "single file" refers to a single piece of data that is constituted by consecutive bits. As described later, the parcel data PD and region data RD are objects of version updating in file units, and version updating is performed in file units.

Hereunder, the fact that the third level parcel data PD3 to fifth level parcel data PD5 are constituted by a single file is described in detail.

FIG. 4A is a view that schematically illustrates the data contents of the upper-level parcel file UPF.

The upper-level parcel file UPF is a binary file (binary data), and the data format thereof is predetermined. As illustrated in FIG. 4A, the upper-level parcel file UPF has an upper-level parcel file header UPH as a header. Upper-level parcel file identification information that is identification information for uniquely identifying the upper-level parcel file UPF is stored in a predetermined area of the upper-level parcel file header UPH.

As illustrated in FIG. 4A, the fifth level parcel data PD5, the fourth level parcel data PD4 and the third level parcel data PD3 are stored in the upper-level parcel file UPF. In the upper-level parcel file UPF, predetermined data that indicates a border of level parcel data is stored at a border of each piece of level parcel data, and the respective pieces of level parcel data are distinguished by taking the relevant predetermined data as a border and also using an index that is in the upper-level parcel file header UPH.

On the other hand, in the parcel data PD, the first level parcel data PD1 and the second level parcel data PD2 are constituted by a plurality of files in the following form.

As described above, a single piece of second level mesh parcel data MP2 corresponds to four pieces of first level mesh parcel data MP1. Further, the second level parcel data PD2 and the first level parcel data PD1 have a lower-level parcel file DPF for each piece of second level parcel data PD2, and a single lower-level parcel file DPF has a single piece of second level mesh parcel data MP2 and four pieces of first level mesh parcel data MP1 that correspond thereto.

FIG. 4B is a view that schematically illustrates the data of the lower-level parcel file DPF.

As described above, a lower-level parcel file DPF exists for each piece of second level mesh parcel data MP2 constituting the second level parcel data PD2. In the present embodiment, the second level parcel data PD 2 is constituted by n pieces of second level mesh parcel data MP2. Accordingly, there are n lower-level parcel files DPF, i.e. a lower-level parcel file DPF-1 to a lower-level parcel file DPF-n.

As illustrated in FIG. 4B, a single lower-level parcel file DPF has a lower-level parcel file header DPH as a header. Lower-level parcel file identification information that is identification information for uniquely identifying the lower-level parcel file DPF is stored in a predetermined area of the lower-level parcel file header DPH.

As illustrated in FIG. 4B, a single piece of second level mesh parcel data MP2 and four pieces of first level mesh parcel data MP1 corresponding thereto are stored in a single lower-level parcel file DPF. In the lower-level parcel file DPF, predetermined data indicating a border of the level parcel data is stored at a border of each piece of mesh data. The respective pieces of mesh data are distinguished by taking the predetermined data in question as a border.

<Description of Region Data RD>

FIGS. 5A to 5D are views that schematically illustrate the region data RD.

As illustrated in FIGS. 5A to 5D, the region data RD includes four pieces of data, namely, first level region data RD1 (FIG. 5D), second level region data RD2 (FIG. 5C), third level region data RD3 (FIG. 5B) and fourth level region data RD4 (FIG. 5A), that correspond to four levels from a region scale factor level RLV1 to a region scale factor level RLV4. Hereunder, the first level region data RD1 to fourth level region data RD4 are described as "level region data" when not making a distinction therebetween.

The term "region scale factor level" expresses the level of a scale factor using four levels from the region scale factor level RLV1 to the region scale factor level RLV4. The level of the scale factor decreases in stages from the region scale factor level RLV1 towards the region scale factor level RLV4.

The region scale factor level RLV1 is a level that corresponds to the parcel scale factor level PV2. The region scale factor level RLV2 is a level that corresponds to the parcel scale factor level PV3. The region scale factor level RLV3 is a level that corresponds to the parcel scale factor level PV4. The region scale factor level RLV4 is a level that corresponds to the parcel scale factor level PV5.

The respective pieces of level region data include data for route searching that is used for route searching on a map at a scale factor corresponding to the relevant region scale factor level. The data for route searching has information that is necessary for route searching such as node information which has information relating to nodes that correspond to connection points such as intersections on road networks, and link information which has information relating to links that correspond to roads that are formed between one node and another node. The control unit 10 searches for a route from a place of departure to a destination based on the respective pieces of level region data.

The respective pieces of level region data are divided into mesh units, similarly to the respective pieces of level parcel data. Each piece of level region data includes one or a plurality of pieces of mesh data. The respective pieces of mesh data have data for route searching that is made available for route searching in the corresponding mesh. Hereunder, the mesh data of the first level region data RD1 is referred to as "first level mesh region data MR1", the mesh data of the second level region data RD2 is referred to as "second level mesh region data MR2", the mesh data of the third level region data RD3 is referred to as "third level mesh region data MR3" and the mesh data of the fourth level region data RD4 is referred to as "fourth level mesh region data MR4".

FIG. 5A to FIG. 5D each represent a piece of level region data that corresponds to a predetermined region on a map, and the respective pieces of level region data of the respective maps represent mesh data that constitutes the respective pieces of level parcel data. As illustrated in FIGS. 5(A) and (B), a single piece of fourth level mesh region data MR4 corresponds to four pieces of third level mesh region data MR3. As illustrated in FIGS. 5(B) and (C), a single piece of third level mesh region data MR3 corresponds to four pieces of second level mesh region data MR2. As illustrated in FIGS. 5(C) and (D), a single piece of second level mesh region data MR2 corresponds to four pieces of first level mesh region data MR1.

In the present embodiment, the first level region data RD1 to fourth level region data RD4 are constituted by a single region file RF.

Hereunder, the fact that the first level region data RD1 to fourth level region data RD4 are constituted by a single file is described in detail.

FIG. 6 is a view that schematically illustrates the data contents of the region file RF.

The region file RF is a binary file (binary data), and the data format thereof is predetermined. As illustrated in FIG. 6, the region file RF has a region file header RH as a header. Region file identification information that is identification information for uniquely identifying the region file RF is stored in a predetermined area of the region file header RH.

As illustrated in FIG. 6, the fourth level region data RD4, third level region data RD3, second level region data RD2 and first level region data RD1 are stored in the region file RF. In the region file RF, predetermined data indicating a border of the level region data is stored at borders between the respective pieces of level region data. The respective pieces of level region data are distinguished by taking the predetermined data in question as a border, and also using an index that is in the region file header RH.

FIG. 7 is a table that shows the relation between the respective files constituting the parcel data PD and region data RD, and the number of files of the respective files.

As described above, the parcel data PD is constituted by one upper-level parcel file UPF and a plurality of lower-level parcel files DPF. The number of the lower-level parcel files DPF included in the parcel data PD corresponds to the number (in the present embodiment, "n") of pieces of second level mesh parcel data MP2 constituting the second level parcel data PD2. Further, the region data RD is constituted by a single region file RF. Thus, in the present embodiment, while on one hand the parcel data PD is constituted by a plurality of files in a predetermined form, on the other hand the region data RD is constituted by a single file. The effects of this configuration will be described in detail later.

Next, the functions of the map data management server 4 will be described. In addition, the upper-level parcel file management database 221, the lower-level parcel file management database 222, and the region file management database 223 which the server storage unit 22 of the map data management server 4 stores will be described.

In the map data management server 4, the version of each of the upper-level parcel file UPF, the plurality of lower-level parcel files DPF and the region file RF is updated at a predetermined timing. The map data management server 4 has a function that stores and manages the respective files of the respective versions.

Version updating of the upper-level parcel file UPF, the plurality of lower-level parcel files DPF and the region file RF will now be described using FIGS. 8A to 8C. Updating of the versions of the respective files is performed simultaneously at a predetermined timing. The map data management server 4 manages the latest version of each file as an integrated version. For example, as illustrated in FIG. 8A, it is assumed that the initial version of each of the upper-level parcel file UPF, the plurality of lower-level parcel files DPF and the region file RF is "ver 1.0". In this case, the map data management server 4 manages an integrated version that indicates "ver 1.0". Note that the term "ver 1.0" shows that the version is "1.0". Versions described hereunder are also represented in a similar manner.

Thereafter, as illustrated in FIG. 8B, updating of the version of each file is performed, and the version of each file becomes "ver 1.1". As described above, updating of the version of each file is performed simultaneously, and the version of the respective files is changed to the same value simultaneously. At the time of version updating, the value of the version is changed even if there is no change in the contents accompanying updating of the version. In this case, the map data management server 4 manages an integrated version showing "ver 1.1". In addition, as illustrated in FIG. 8C, in a case where version updating of each file is performed and the version of each file becomes "ver 1.2", the map data management server 4 manages an integrated version showing "ver 1.2".

The upper-level parcel file management database 221 that the map data management server 4 stores is a database that manages the upper-level parcel file UPF of each version. The lower-level parcel file management database 222 is a database that manages the lower-level parcel file DPF of each version. The region file management database 223 is a database that manages the region file RF of each version. Hereunder, each of these databases will be described.

<Description of Upper-Level Parcel File Management Database 221>

FIG. 9A is a view that schematically illustrates the contents of the upper-level parcel file management database 221 (hereunder, referred to as "upper-level parcel DB 221").

In the upper-level parcel DB 221, a record is provided for each version of the upper-level parcel file UPF. As illustrated in FIG. 9A, a single record includes four fields, namely, a field FA1 to a field FA4.

In the field FA1 of a record corresponding to the upper-level parcel file UPF of one version, upper-level parcel file identification information of the upper-level parcel file UPF of the relevant one version is stored. The upper-level parcel file identification information does not change depending on the version, and hence the value that is stored for the upper-level parcel file identification information in the field FA1 of each record of the upper-level parcel DB 221 is the same.

In the field FA2 of a record corresponding to the upper-level parcel file UPF of one version, actual data of the upper-level parcel file UPF of the relevant one version is stored.

Further, in the field FA3 of a record corresponding to the upper-level parcel file UPF of one version, upper-level parcel version information that shows the version of the upper-level parcel file UPF of the relevant one version is stored.

Furthermore, in the field FA4 of a record corresponding to the upper-level parcel file UPF of one version, binary difference data (hereunder, referred to as "upper-level parcel difference data") that shows the difference between the upper-level parcel file UPF of the relevant one version and an upper-level parcel file UPF of the previous generation is stored. The term "upper-level parcel file UPF of the previous generation" of the upper-level parcel file UPF of one version refers to an upper-level parcel file UPF after version updating was performed the time immediately prior to performing version updating with respect to the relevant one version. The same applies with respect to other files also. As described above, the upper-level parcel file UPF is a binary file (binary data) in a predetermined format. Accordingly, with respect to two upper-level parcel files UPF whose versions are different, it is possible to extract upper-level parcel difference data that is binary difference data by means of an existing binary difference extracting method. This similarly applies with respect to the lower-level parcel file DPF and the region file RF.

<Description of Lower-Level Parcel File Management Database 222>

FIG. 9B is a view that schematically illustrates the contents of the lower-level parcel file management database 222 (hereunder, referred to as "lower-level parcel DB 222").

The server storage unit 22 of the map data management server 4 stores n (where "n" denotes a natural number) of the lower-level parcel DBs 222, namely, a lower-level parcel DB 222-1 to a lower-level parcel DB 222-n in correspondence to n of the lower-level parcel files DPF, namely, a lower-level parcel file DPF-1 to a lower-level parcel file DPF-n.

In the lower-level parcel DB 222, a record is provided for each version of the lower-level parcel file DPF. As illustrated in FIG. 9B, a single record includes four fields, namely, a field FB1 to a field FB4.

In the field FB1 of a record corresponding to the lower-level parcel file DPF of one version, lower-level parcel file identification information of the lower-level parcel file DPF of the relevant one version is stored.

In the field FB2 of a record corresponding to the lower-level parcel file DPF of one version, actual data of the lower-level parcel file DPF of the relevant one version is stored.

Further, in the field FB3 of a record corresponding to the lower-level parcel file DPF of one version, lower-level parcel version information that shows the version of the lower-level parcel file DPF of the relevant one version is stored.

Furthermore, in the field FB4 of a record corresponding to the lower-level parcel file DPF of one version, lower-level parcel difference data that is binary difference data that shows the difference between the lower-level parcel file DPF of the relevant one version and a lower-level parcel file DPF of the previous generation is stored.

<Description of Region File Management Database 223>

FIG. 9C is a view that schematically illustrates the contents of the region file management database 223.

In the region file management database 223, a record is provided for each version of the region file RF. As illustrated in FIG. 9C, one record has four fields, namely, a field FC1 to a field FC4.

In the field FC1 of a record corresponding to the region file RF of one version, region file identification information of the region file RF of the relevant one version is stored.

In the field FC2 of a record corresponding to the region file RF of one version, actual data of the region file RF of the relevant one version is stored.

Further, in the field FC3 of a record corresponding to the region file RF of one version, region file version information that shows the version of the region file RF of the relevant one version is stored.

Furthermore, in the field FC4 of a record corresponding to the region file RF of one version, region file difference data that is binary difference data showing the difference between the region file RF of the relevant one version and a region file RF of the previous generation is stored.

The foregoing is a description of the upper-level parcel DB 221, the lower-level parcel DB 222 and the region file management database 223. The in-vehicle apparatus 3 communicates with the map data management server 4 and, based on the aforementioned databases, updates the versions of the parcel data PD and the region data RD which the in-vehicle apparatus 3 stores. Further, in the present embodiment, when updating the versions of the parcel data PD and the region data RD, by the in-vehicle apparatus 3 executing processing that is described hereunder, the amount of data that is exchanged between the in-vehicle apparatus 3 and the map data management server 4 is reduced and the occurrence of a decrease in the convenience of a user that can occur accompanying version updating is suppressed.

Hereunder, operations of the in-vehicle apparatus 3 and the map data management server 4 relating to version updating of the parcel data PD and the region data RD are described.

Taking the establishment of a predetermined condition as a trigger, the in-vehicle apparatus 3 performs version updating of the parcel data PD or the region data RD by a method that corresponds to the established condition.

Hereunder, operations of the in-vehicle apparatus 3 and the map data management server 4 are described with respect to respective triggers that starts version updating.

<Operations of In-Vehicle Apparatus 3 and Map Data Management Server 4 Performed Taking Establishment of First Condition as Trigger>

FIGS. 10A and 10B are flowcharts that illustrate operations of the in-vehicle apparatus 3 and the map data management server 4, in which FIG. 10A shows operations of the in-vehicle apparatus 3 and FIG. 10B shows operations of the map data management server 4.

As shown in FIG. 10A, the control unit 10 of the in-vehicle apparatus 3 performs monitoring with respect to whether or not an ACC power source of the vehicle 2 is turned on, whether or not there is a change in a registered home location, and whether or not a home location is newly registered (step SA1). The in-vehicle apparatus 3 according to the present embodiment is configured to activate in response to the ACC power source of the vehicle 2 being turned on. Further, the in-vehicle apparatus 3 according to the present embodiment is configured so that a user can register a home location by a predetermined method or can change a registered home location.

A fact that the ACC power source was turned on, a fact that a change was made to the registered home location, or a fact that a home location was newly registered corresponds to a "first condition", and the control unit 10 executes the following processing in step SA2 taking a fact that the relevant first condition was established as a trigger for execution of the processing.

If the first condition is established (step SA1: YES), the control unit 10 makes an inquiry to the map data management server 4 about the integrated version (step SA2). As described above, the integrated version is the latest version of the upper-level parcel file UPF, the lower-level parcel file DPF and the region file RF. The control unit 10 makes the inquiry in step SA2 by transmitting data in a predetermined format to the map data management server 4 through the portable terminal 5. In the following explanation also, communication between the in-vehicle apparatus 3 and the map data management server 4 is performed by data in a predetermined format being exchanged through the portable terminal 5.

As illustrated in FIG. 10B, the server control unit 20 of the map data management server 4 acquires the integrated version that is being managed (step SB1).

Next, the server control unit 20 transmits information showing the integrated version acquired in step SB1 to the in-vehicle apparatus 3 (step SB2).

As illustrated in FIG. 10A, upon receiving the information showing the integrated version that the map data management server 4 transmitted, the control unit 10 of the in-vehicle apparatus 3 acquires the region file version information of the region file RF that the storage unit 16 stores (step SA3).

The version management database 161 is stored in the storage unit 16 of the in-vehicle apparatus 3. For the respective files constituting the parcel data PD and the region data RD (one upper-level parcel file UPF, a plurality of lower-level parcel files DPF, and one region file RF), the version management database 161 associates and stores identification information for each file (upper-level parcel file identification information, lower-level parcel file identification information and region file identification information) and version information for each file (upper-level parcel file identification information, lower-level parcel version information and region file version information). In step SA3, the control unit 10 refers to the version management database 161 and acquires region file version information.

Next, the control unit 10 compares the information showing the integrated version that was received from the map data management server 4 and the region file version information that was acquired in step SA3 (step SA4), and determines whether or not the respective values of these items of information match (whether or not the versions match) (step SA5).

If the versions match (step SA5: YES), the control unit 10 ends the processing.

In contrast, if the versions do not match (step SA5: NO), the control unit 10 shifts the procedure to step SA6.

In this case, as described later, in the processing from step SA6 onwards, the control unit 10 executes version updating of at least the region file RF. Accordingly, by determining whether or not the version of the region file RF which the in-vehicle apparatus 3 stores and the integrated version which the map data management server 4 manages match each other, it can be determined whether or not the version of the region file RF which the in-vehicle apparatus 3 stores by execution of the processing from step SA6 onwards is already the latest version, and it can be accurately determined whether or not the processing from step SA6 onwards should be executed.

In step SA6, in a map at the scale factor of parcel scale factor level PLV2, the control unit 10 identifies meshes belonging to a rectangular region of approximately 80 square km that is centered on the registered home location, and acquires lower-level parcel file identification information of the lower-level parcel file DPF and lower-level parcel version information corresponding to each of the identified meshes. Hereunder, the processing in step SA6 will be described in detail.

FIG. 11 is a view in which a registered home location and meshes are displayed on a map at parcel scale factor level PLV2. In the present embodiment, each mesh corresponding to parcel scale factor level PLV2 represents a rectangular region of approximately 10 square km.

In step SA6, first, the control unit 10 identifies the registered home location in the map at the scale factor of parcel scale factor level PLV2, and calculates a rectangular region of approximately 80 square km that is centered on the home location. In FIG. 11, the region that is calculated by the control unit 10 is represented by a chain double-dashed line. Next, the control unit 10 identifies the meshes that belong to the calculated region. In FIG. 11, the meshes identified by the control unit 10 are represented by a diagonal line pattern. Next, the control unit 10 identifies the lower-level parcel file identification information of the respective lower-level parcel files DPF corresponding to the respective meshes that were identified. Subsequently, the control unit 10 refers to the version management database 161 and acquires lower-level parcel version information corresponding to the respective items of lower-level parcel file identification information that were identified. In the above manner, in step SA6, the control unit 10 acquires lower-level parcel file identification information and lower-level parcel version information for the respective lower-level parcel files DPF that correspond to the meshes belonging to the rectangular region of 80 square km that is centered on the registered home location.

In the following description, a lower-level parcel file DPF corresponding to a mesh that belongs to the rectangular region of 80 square km that is centered on the registered home location is described as a "target lower-level parcel file", and lower-level parcel file identification information and lower-level parcel version information of each target lower-level parcel file are described as "target lower-level parcel file identification information" and "target lower-level parcel version information", respectively.

Next, for each target lower-level parcel file, the control unit 10 transmits a combination of the target lower-level parcel file identification information and the target lower-level parcel version information to the map data management server 4 (step SA7).

As illustrated in FIG. 10B, the server control unit 20 of the map data management server 4 receives a combination of the target lower-level parcel file identification information and the target lower-level parcel version information for each target lower-level parcel file, and executes the following processing (step SB3).

In step SB3, the server control unit 20 executes the following processing for the respective combinations of target lower-level parcel file identification information and lower-level parcel version information that are received.

That is, the server control unit 20 refers to the lower-level parcel DB 222 that corresponds to the target lower-level parcel file identification information, and determines whether or not the version of the file which the in-vehicle apparatus 3 stores (=version indicated by the target lower-level parcel file version information) and the latest version of the file that the map data management server 4 manages match. If the versions do not match, the server control unit 20 acquires one or a plurality of pieces of lower-level parcel difference data that correspond to the difference between the versions, based on the lower-level parcel DB 222.

By performing the above processing, in step SB3 the server control unit 20 acquires lower-level parcel difference data that corresponds to the difference with the latest version of the file for each target lower-level parcel file whose version is not the latest version in the in-vehicle apparatus 3.

The processing in step SB3 will now be described by way of an example using FIG. 9B.

A lower-level parcel DB 222-1 shown in FIG. 9B is a lower-level parcel DB 222 that corresponds to a lower-level parcel file DPF whose lower-level parcel file identification information is "DPF000001". When the map data management server 4 stores the lower-level parcel DB 222-1 shown in FIG. 9B, in step SB3 the server control unit 20 executes the following processing in a case where a combination of lower-level parcel file identification information indicating "DPF000001" and lower-level parcel file identification information indicating "ver 1.1" is received.

That is, the server control unit 20 refers to the lower-level parcel DB 222-1 and determines that the latest version of the lower-level parcel file DPF having the lower-level parcel file identification information "DPF000001" is "ver 1.2", and thus determines that the version ("ver 1.1") of the file which the in-vehicle apparatus 3 stores and the latest version ("ver 1.2") which the map data management server 4 manages do not match. Note that, as illustrated in FIG. 9B, with respect to the lower-level parcel file DPF having the lower-level parcel file identification information "DPF000001", "ver 1.1" is a version that is the previous generation relative to "ver 1.2".

Next, the server control unit 20 refers to the lower-level parcel DB 222-1 and acquires lower-level parcel difference data (ver 1.2-1.1) that is binary difference data which shows the difference between the lower-level parcel file DPF (ver 1.2) and the lower-level parcel file DPF (ver 1.1). Note that, the term "lower-level parcel file DPF (ver 1.2)" means the lower-level parcel file DPF whose version is "1.2". Hereunder, for all files including the lower-level parcel file DPF, the version is similarly described when explicitly indicating the version. Further, the term "lower-level parcel difference data (ver 1.2-1.1)" refers to lower-level parcel difference data that corresponds to the difference between the lower-level parcel difference data (ver 1.2) and the lower-level parcel difference data (ver 1.1). Hereunder, with respect to all items of binary difference data including lower-level parcel difference data, the version is similarly described when explicitly indicating the version.

Further, a lower-level parcel DB 222-2 shown in FIG. 9B is a lower-level parcel DB 222 that corresponds to a lower-level parcel file DPF for which the lower-level parcel file identification information is "DPF000002". When the map data management server 4 stores the lower-level parcel DB 222-2 shown in FIG. 9B, in step SB3 the server control unit 20 executes the following processing in a case where a combination of lower-level parcel file identification information indicating "DPF000002" and lower-level parcel file identification information indicating "ver 1.0" is received.

That is, the server control unit 20 refers to the lower-level parcel DB 222-2 and determines that the latest version of the lower-level parcel file DPF having the lower-level parcel file identification information "DPF000002" is "ver 1.2", and thus determines that the version ("ver 1.0") of the file which the in-vehicle apparatus 3 stores and the latest version ("ver 1.2") which the map data management server 4 manages do not match. Note that, as illustrated in FIG. 9B, with respect to the lower-level parcel file DPF having the lower-level parcel file identification information "DPF000002", "ver 1.0" is a version that is two generations prior to "ver 1.2".

Next, the server control unit 20 refers to the lower-level parcel DB 222-2 and acquires lower-level parcel difference data for two generations that corresponds to the difference between the lower-level parcel file DPF (ver 1.2) and the lower-level parcel file DPF (ver 1.0). Specifically, the server control unit 20 refers to the lower-level parcel DB 222-2 and acquires the lower-level parcel difference data (ver 1.2-1.1) and lower-level parcel difference data (ver 1.1-1.0).

Further, a lower-level parcel DB 222-3 shown in FIG. 9C is a lower-level parcel DB 222 that corresponds to a lower-level parcel file DPF for which the lower-level parcel file identification information is "DPF000003". When the map data management server 4 stores the lower-level parcel DB 222-3 shown in FIG. 9C, in step SB3 the server control unit 20 executes the following processing in a case where a combination of lower-level parcel file identification information indicating "DPF000003" and lower-level parcel file identification information indicating "ver 1.2" is received.

That is, the server control unit 20 refers to the lower-level parcel DB 222-3 and determines that the latest version of the lower-level parcel file DPF having the lower-level parcel file identification information "DPF000003" is "ver 1.2", and thus determines that the version ("ver 1.2") of the file which the in-vehicle apparatus 3 stores and the latest version ("ver 1.2") which the map data management server 4 manages match. In this case, the server control unit 20 does not acquire lower-level parcel difference data.

After the processing in step SB3 is executed, for each target lower-level parcel file which is not the latest version, the server control unit 20 transmits a combination of the lower-level parcel file identification information, the lower-level parcel version information of the latest lower-level parcel file DPF that the map data management server 4 manages, and the lower-level parcel difference data acquired in step SB3 to the in-vehicle apparatus 3 (step SB4). For example, in step SB4, for the target lower-level parcel file having the lower-level parcel file identification information "DPF000001" that is described above, the server control unit 20 transmits a combination of the identification information in question, lower-level parcel version information showing the latest version of the file in question, and lower-level parcel difference data (ver 1.1-1.1). Further, for example, in step SB4, for the target lower-level parcel file having the lower-level parcel file identification information "DPF000002" that is described above, the server control unit 20 transmits the identification information in question, lower-level parcel version information showing the latest version of the file in question, and the lower-level parcel difference data (ver 1.2-1.1) and the lower-level parcel difference data (ver 1.1-1.0).

As illustrated in FIG. 10A, upon receiving the data which the map data management server 4 transmitted in step SB4, the control unit 10 of the in-vehicle apparatus 3 refers to the version management database 161 and acquires region file version information of the region file RF (step SA8).

Next, the control unit 10 transmits a combination of the region file version information acquired in step SA8 and region file identification information to the map data management server 4 (step SA9).

As illustrated in FIG. 10B, upon receiving the combination of the region file identification information and the region file version information, the server control unit 20 of the map data management server 4 executes the following processing (step SB5). That is, in step SB5 the server control unit 20 refers to the region file management database 223 and acquires one or a plurality of pieces of region file difference data that corresponds to the difference between the version indicated by the region file version information that is received (version of the region file RF which the in-vehicle apparatus 3 stores) and the latest version of the region file RF that the map data management server 4 manages.

Next, the server control unit 20 transmits a combination of the region file identification information, the region file version information of the latest region file RF that the map data management server 4 manages, and the one or a plurality of pieces of region file difference data that were acquired in step SB5 (step SB6).

As illustrated in FIG. 10A, upon receiving the data which the map data management server 4 transmitted in step SB6, the control unit 10 of the in-vehicle apparatus 3 refers to the version management database 161 and acquires upper-level parcel version information of the upper-level parcel file UPF (step SA10).

Next, the control unit 10 transmits a combination of the upper-level parcel version information acquired in step SA10 and upper-level parcel file identification information to the map data management server 4 (step SA11).

As illustrated in FIG. 10B, upon receiving the combination of the upper-level parcel file identification information and the upper-level parcel version information, the server control unit 20 of the map data management server 4 executes the following processing (step SB7). That is, in step SB7, the server control unit 20 refers to the upper-level parcel DB 221 and acquires one or a plurality of pieces of upper-level parcel difference data that corresponds to the difference between the version indicated by the upper-level parcel version information that is received (version of the upper-level parcel file UPF which the in-vehicle apparatus 3 stores) and the latest version of the upper-level parcel file UPF that the map data management server 4 manages.

Next, the server control unit 20 transmits a combination of the upper-level parcel file identification information, the upper-level parcel version information of the latest upper-level parcel file DPF that the map data management server 4 manages, and the upper-level parcel difference data acquired in step SB7 to the in-vehicle apparatus 3 (step SB8).

As illustrated in FIG. 10A, upon receiving the data transmitted by the map data management server 4 in step SB8, the control unit 10 of the in-vehicle apparatus 3 executes the following processing (step SA12). That is, the control unit 10 copies files to which binary difference data that was received from the map data management server 4 is to be applied to a buffer region that is formed in a predetermined storage area.

Specifically, the control unit 10 copies, to the buffer region, an upper-level parcel file UPF to which the upper-level parcel difference data that was received from the map data management server 4 is to be applied. Further, the control unit 10 copies, to the buffer region, each lower-level parcel file DPF to which the lower-level parcel difference data that was received from the map data management server 4 is to be applied. In this case, a lower-level parcel file DPF that is expanded in the buffer region is a lower-level parcel file DPF that corresponds to a mesh belonging to the rectangular region of approximately 80 square km that is centered on the registered home location, and is a lower-level parcel file DPF which is not the latest version. Further, the control unit 10 copies, to the buffer region, a region file RF to which region file difference data that was received from the map data management server 4 is to be applied. When copying a file to the buffer region, the control unit 10 changes the file name of the copied file in accordance with a predetermined rule so as to be different from the file name of the file that is the copy source.

Next, the control unit 10 applies the corresponding binary difference data to the respective files that were copied to the buffer region (step SA13). By the processing in step SA13, the version of each file expanded in the buffer region is updated, and a state is entered in which the respective files have been synchronized with the latest files that the map data management server 4 manages.

Next, on the display panel 111, the control unit 10 displays information indicating that updating of the version of the map data TD is possible and that it is necessary to restart the in-vehicle apparatus 3 in order to use the updated version of the map data TD, and also displays information inquiring whether or not to execute the restarting that is associated with updating of the version of the map data TD in a form that enables a selection by the user (step SA14).

Subsequently, the control unit 10 monitors whether or not execution of restarting associated with updating of the version of the map data TD is selected by the user (step SA15), and if execution of restarting is selected (step SA15: YES), the control unit 10 shifts the procedure to step SA16.

In step SA16, the control unit 10 changes the file name of each file expanded in the buffer region to the file name of the respective files that are the copy sources, and on the other hand the control unit 10 changes the file name of the respective files that are the copy sources to the file name of the respective files that were expanded in the buffer region. Next, the control unit 10 stores the respective files that were expanded in the buffer region at the storage locations of the respective files that are the copy sources. In this connection, when a control program that executes various kinds of processing including map displaying, route searching and route guidance refers to predetermined files constituting the parcel data PD and the region data RD, the control program identifies the files to be referred to by using the file names of the files as a key. In consideration of this situation, by means of the processing in step SA16, instead of the respective files prior to version updating, the respective files after version updating become the files that are the objects of a referral by the control unit 10.

Next, the control unit 10 updates the version management database 161 based on the data received from the map data management server 4 in steps SB4, SB6 and SB8 (step SA17). By performing the processing in step SA17, with respect to the respective files for which version updating was performed, the value of the version information that is managed by the version management database 161 becomes a value that reflects the version updating operation (a value corresponding to the version of the respective files managed by the map data management server 4).

Next, the control unit 10 restarts the in-vehicle apparatus 3 (step SA18). By means of the processing in step SA18, the control program is initialized and initial processing is performed using the respective files whose versions have been updated, and a state is entered in which the control unit 10 can normally refer to the respective files whose versions have been updated.

As described above, in the present embodiment the region data RD is constituted by a single region file RF. Further, version updating of the region data RD in the in-vehicle apparatus 3 is not performed partially for each piece of level region data or mesh data, but rather is performed en bloc in an overall manner by updating the version of the region file RF. Because such a configuration is adopted, in a case where updating of the version of the region data RD which the in-vehicle apparatus 3 stores is performed, the region data RD which the in-vehicle apparatus 3 stores becomes the latest data that is identical to the latest region data RD that the map data management server 4 manages. Accordingly, with regard to the region data RD, it is possible to prevent the occurrence of a situation in which, due to mixing of mesh data that is the latest version and mesh data that is not the latest version, deviations arise with regard to node information or link information relating to route searching at a border between contiguous meshes or the like and an appropriate route cannot be determined.

Further, in the present embodiment, when the ACC power source is turned on, a determination is made regarding whether or not the version of the region file RF which the in-vehicle apparatus 3 stores and the integrated version that the map data management server 4 manages match, and if the versions do not match, version updating of the region data RD (region file RF) which the in-vehicle apparatus 3 stores is performed. Because such a configuration is adopted, after the in-vehicle apparatus 3 starts up, all of the region data RD becomes the latest version of the data, and the control unit 10 can execute route searching that is performed after start-up by using the latest version of the region data RD. In this connection, if the version of the region data RD in the in-vehicle apparatus 3 is not the latest version, there is a possibility that deviations will arise with respect to the correspondence relation between actual connection points on the road networks and node information which the relevant data has, or with respect to the correspondence relation between actual roads and link information which the relevant data has and the like, and that routes that are not appropriate will be retrieved by route searching that is performed utilizing the relevant data, such as routes being retrieved on which it is not possible to actually travel. On the other hand, because the above described configuration is adopted, such a possibility can be reduced.

Further, in the present embodiment the parcel data PD is constituted by a plurality of files. Specifically, the parcel data PD is constituted by a single upper-level parcel file UPF and a plurality of lower-level parcel files DPF. The upper-level parcel file UPF has the third level parcel data PD3, the fourth level parcel data PD4 and the fifth level parcel data PD5, and version updating thereof is not performed partially for each piece of level parcel data or mesh data, but rather is performed en bloc in an overall manner by updating the version of the upper-level parcel file UPF. Because such a configuration is adopted, when displaying a map that corresponds to a scale factor from parcel scale factor level PLV3 to parcel scale factor level PLV5, it is possible to prevent the occurrence of a situation in which, due to mixing of mesh data that is the latest version and mesh data that is not the latest version, deviations arise in the map at borders between contiguous meshes and consequently the map is not displayed appropriately.

In particular, in the case of displaying a map for which the scale factor is small, such as a map at a scale factor corresponding to any one of parcel scale factor level PLV3 to parcel scale factor level PLV5, deviations in the map at borders between meshes that are due to mixing of new and old mesh data are liable to stand out. However, since the above described configuration is adopted, such kind of deviations in a map can be effectively prevented.

Furthermore, in the case of displaying a map for which the scale factor is small, such as a map at a scale factor corresponding to any one of parcel scale factor level PLV3 to parcel scale factor level PLV5, a map of a wider area in comparison to a map at a scale factor corresponding to parcel scale factor level PLV1 or parcel scale factor level PLV2 is displayed on the display panel 111. By performing version updating with respect to the upper-level parcel file UPF en bloc in an overall manner as in the present embodiment, a map of a wide area that is displayed on the display panel 111 can be displayed without generating deviations at borders between meshes.

Note that, the data amount of the third level parcel data PD3, the fourth level parcel data PD4 and the fifth level parcel data PD5 is less than the data amount of the first level parcel data PD1 and the second level parcel data PD2. Accordingly, when updating the version of the upper-level parcel file UPF, an increase in the data amount of the upper-level parcel difference data which the map data management server 4 transmits to the in-vehicle apparatus 3 in comparison to the data amount in a case of transmitting binary difference data for each piece of mesh data for which the version is different is limited. Therefore, an increase in the amount of data in communication that arises accompanying updating of the version of the upper-level parcel file UPF that is performed en bloc in an overall manner is limited.

Further, in the present embodiment the first level parcel data PD1 and the second level parcel data PD2 are constituted by a plurality of files. Specifically, the first and second level parcel data PD1 and PD2 are constituted by one lower-level parcel file DPF for every item of second level mesh parcel data MP2. Further, in the case of version updating with respect to the first level parcel data PD1 and the second level parcel data PD2, all of the lower-level parcel files DPF are not updated simultaneously en bloc, but rather partial updating is performed for specific lower-level parcel files DPF. In comparison to the third level parcel data PD3 to fifth level parcel data PD5, the number of pieces of mesh data of the first level parcel data PD1 and the second level parcel data PD2 is greater and the data amount of the mesh data is also larger. Accordingly, if a configuration is adopted which performs version updating of the first level parcel data PD1 and the second level parcel data PD2 by simultaneously updating all of the lower-level parcel files DPF en bloc, at the time of updating the versions of these data items it is necessary for the in-vehicle apparatus 3 to transmit the identification information and version information of all the mesh data, and it is also necessary for the map data management server 4 to transmit binary difference data with respect to all of the mesh data items whose version is different, and thus the amount of data communicated between the in-vehicle apparatus 3 and the map data management server 4 is large. However, because the above described configuration is adopted, when updating the respective versions of the first level parcel data PD1 and the second level parcel data PD2, the map data management server 4 need only transmit lower-level parcel difference data corresponding to specific lower-level parcel files DPF to the in-vehicle apparatus 3, and hence the amount of data communicated between the map data management server 4 and the in-vehicle apparatus 3 can be effectively reduced.

Further, with respect to the first level parcel data PD1 and second level parcel data PD2 whose data amounts are comparatively large, it is not necessary for the map data management server 4 to transmit binary difference data for updating all of the data, in other words, data that corresponds to the entire country. Accordingly, the amount of data communicated between the map data management server 4 and the in-vehicle apparatus 3 can be reduced. Similarly, it is not necessary for the in-vehicle apparatus 3 to update the first level parcel data PD1 and second level parcel data PD2 corresponding to the entire country. Therefore, by suppressing to the utmost the time that is required for updating the map, the convenience of the user can be improved.

Further, in the present embodiment, when updating the version of the first level parcel data PD1 and the second level parcel data PD2, the in-vehicle apparatus 3 performs version updating of lower-level parcel files DPF that correspond to meshes belonging to a predetermined region that is centered on a registered home location. In general, a user drives the vehicle 2 in a manner takes a registered home location as a starting point. Accordingly, the region around the registered home location is a region for which there is a high possibility that the vehicle 2 will travel in that area, and furthermore, in view of the characteristic of the in-vehicle apparatus 3 that a map that is centered on the current position of the vehicle 2 is displayed, the region around the home location is a region for which there is a high possibility of being displayed as a map on the display panel 111. In consideration of these facts, according to the above described configuration, among the lower-level parcel files DPF that constitute the first level parcel data PD1 and the second level parcel data PD2, version updating is performed with a priority that progressively rises as the degree to which a lower-level parcel file DPF corresponds to a region for which there is a high possibility of being displayed increases, and hence after decreasing the amount of data that is communicated, the possibility of deviations being displayed in a map at a border between meshes that are caused by mixing of new and old mesh data can be effectively reduced.

Further, in the present embodiment, the in-vehicle apparatus 3 takes a fact that a home location was newly registered or that there was a change in a registered home location as a trigger to perform version updating of a lower-level parcel file DPF corresponding to the home location after the change. Even in a case where there was a change in the home location, the possibility of a deviation being displayed in a map at a border between meshes that is caused by mixing of new and old mesh data can be effectively reduced.

In the present embodiment, a single lower-level parcel file DPF has a single piece of second level mesh parcel data MP2 and four pieces of first level mesh parcel data MP1 that correspond to the single piece of second level mesh parcel data MP2. Further, since version updating with respect to the lower-level parcel file DPF is performed in file units, version updating of the single piece of second level mesh parcel data MP2 and the four pieces of first level mesh parcel data MP1 corresponding thereto is simultaneously performed en bloc. Because this configuration is adopted, it is possible to prevent the occurrence of a lack of consistency that is due to a difference in versions between a single piece of second level mesh parcel data MP2 and four pieces of first level mesh parcel data MP1 that correspond thereto, and the consistency of a map at identical regions can be maintained when the scale factor of the map is transitioned between the scale factor of parcel scale factor level PLV2 and the scale factor of parcel scale factor level PLV1.

Note that, in the present embodiment, the reasons that, with respect to the region data RD, for example, partial updating for each mesh is not performed, and instead the region data RD is updated en bloc (in other words, for the entire country) to the latest version, and on the other hand, partial (more strictly speaking, for each single mesh or each four meshes) version updating is performed with respect to the parcel data PD (more strictly speaking, the first level mesh parcel data MP1 and the second level mesh parcel data MP2) are as follows. That is, if, for instance, the in-vehicle apparatus 3 attempts to perform route searching using region data RD of different versions, there is the problem that in some cases it will not be possible to complete a route due to inconsistencies between the region data RD of different versions, such as breaks in connections between links in link information or the like. On the other hand, even if map displaying is performed based on parcel data PD of different versions, for example, although deviations arise in the display at borders between meshes, this is because it can be said that the convenience for the user is higher in comparison to the time and cost required for the in-vehicle apparatus 3 to collectively receive all the parcel data PD from the map data management server 4 and perform updating thereof.

Further, in the present embodiment, the processing in the above described step SA6 to step SA13 is executed in a state in which normal processing of the in-vehicle apparatus 3 is executable. That is, in the in-vehicle apparatus 3, separately to the task that executes normal processing, one or a plurality of tasks for executing the processing from step SA6 to step SA13 is activated, and the relevant one or a plurality of tasks execute the processing from step SA6 to step SA13 concurrently with the task that executes the normal processing. Further, during execution of the processing from step SA6 to step SA13, the control unit 10 executes processing such as map displaying, route searching and route guidance based on the respective files in the state prior to the version updating that is performed by the processing from step SA6 to step SA13. In this connection, as described above, in the present embodiment, when updating the parcel data PD and the region data RD, the amount of data communicated between the in-vehicle apparatus 3 and the map data management server 4 is small, and accordingly the time required for communication is short. Further, with respect to the lower-level parcel files DPF, version updating is not performed for all of the lower-level parcel files DPF, but rather the version updating is performed for some (for example, 64 files) of the lower-level parcel files DPF which are the files that correspond to the registered home location. Accordingly, the time required for version updating of the respective files is short, and the processing load with respect to the processing for version updating is small. Therefore, the time period from the start of execution of the processing in step SA6 until the processing in step SA13 is completed is short, and the time period from startup until the respective files after version updating can be used is short. Thus, a decrease in the convenience of the user that can arise accompanying updating of the versions of the respective files can be suppressed. In addition, the occurrence of adverse effects on normal processing due to an increase in the CPU usage rate or the like caused by execution of the processing from step SA6 to step SA13 can be suppressed.

<Operations of In-Vehicle Apparatus 3 and Map Data Management Server 4 Performed Taking Establishment of Second Condition as Trigger>

FIGS. 12A and 12B are flowcharts that illustrate operations of the in-vehicle apparatus 3 and the map data management server 4 in a case where a second condition that is different to the first condition is established, in which (A) shows operations of the in-vehicle apparatus 3 and (B) shows operations of the map data management server 4.

As shown in FIG. 12A, the control unit 10 of the in-vehicle apparatus 3 performs monitoring with respect to whether or not a destination is set by the user (step SC1). The user can set a destination by means of a user interface which the in-vehicle apparatus 3 provides.

A fact that a destination was set corresponds to a "second condition", and the control unit 10 executes the following processing in step SC2 taking a fact that the second condition was established as a trigger for execution of the processing.

If the first condition is established (step SC1: YES), the control unit 10 makes an inquiry to the map data management server 4 about the integrated version which the map data management server 4 manages (step SC2).

As illustrated in FIG. 12B, the server control unit 20 of the map data management server 4 acquires the integrated version which the map data management server 4 manages (step SD1).

Next, the server control unit 20 transmits information showing the integrated version that was acquired in step SD1 to the in-vehicle apparatus 3 (step SD2).

As illustrated in FIG. 12A, upon receiving the information showing the integrated version that the map data management server 4 transmitted, the control unit 10 of the in-vehicle apparatus 3 acquires the region file version information of the region file RF that the storage unit 16 stores (step SC3).

Next, the control unit 10 compares the information showing the integrated version that was received from the map data management server 4 and the region file version information that was acquired in step SC3 (step SC4), and determines whether or not the respective values of these items of information match (whether or not the versions match) (step SC5).

If the versions do not match (step SC5: NO), the control unit 10 executes the processing from step SA6 to step SA18 in the flowchart in FIG. 10A (step SC6). As described above, if the version of the region file RF that the in-vehicle apparatus 3 stores is not the latest version, there is a possibility that route searching will not be performed appropriately. Accordingly, in a case where a destination has been set and the version of the region file RF that the in-vehicle apparatus 3 stores is not the latest version, in comparison to continuing the processing without updating the version of the region file RF, the convenience of the user can be improved by interrupting the processing and updating the version of the region file RF. In view of this fact, in a case where a destination has been set and the version of the region file RF that the in-vehicle apparatus 3 stores is not the latest version, the control unit 10 executes the processing from step SA6 to step SA18 in the flowchart in FIG. 10A to update the version of the region file RF.

Note that, when shifting the procedure from step SC5 to step SC6, on the display panel 111, the control unit 10 may display a message to the effect that, because the map data TD is not the latest version thereof, the processing is being interrupted to update the map data TD.

On the other hand, in step SC5, if the versions match (step SC5: YES), the control unit 10 executes the following processing (step SC7). That is, the control unit 10 identifies the location of the destination on the map at the scale factor of parcel scale factor level PLV2. Next, the control unit 10 calculates a rectangular region of approximately 10 square km that is centered on the location of the destination. Next, the control unit 10 identifies the meshes that belong to the calculated region. The control unit 10 then identifies the lower-level parcel file identification information of the lower-level parcel files DPF corresponding to the respective meshes that were identified. Next, the control unit 10 refers to the version management database 161 and acquires lower-level parcel version information corresponding to the lower-level parcel file identification information that was identified. In the above manner, in step SC7, the control unit 10 acquires lower-level parcel file identification information and lower-level parcel version information for the respective lower-level parcel files DPF that correspond to the meshes belonging to the rectangular region of approximately 10 square km that is centered on the destination that was set.

In the following description, a lower-level parcel file DPF corresponding to a mesh that belongs to the rectangular region of approximately 10 square km that is centered on the destination that was set is described as a "destination vicinity lower-level parcel file", and the lower-level parcel file identification information and lower-level parcel version information of each destination vicinity lower-level parcel file are described as "destination vicinity lower-level parcel file identification information" and "destination vicinity lower-level parcel version information", respectively.

Next, for the respective destination vicinity lower-level parcel files, the control unit 10 identifies destination vicinity lower-level parcel files which are not the latest version based on a comparison between the destination vicinity lower-level parcel file identification information and the information showing the integrated version that is received in step SC3. Further, for each destination vicinity lower-level parcel file that is identified as not being the latest version, the control unit 10 transmits a combination of the destination vicinity lower-level parcel file identification information and the destination vicinity lower-level parcel version information to the map data management server 4 (step SC8).

As illustrated in FIG. 12B, the server control unit 20 of the map data management server 4 receives the combination of the destination vicinity lower-level parcel file identification information and the destination vicinity lower-level parcel file version information for each destination vicinity lower-level parcel file that is not the latest version, and executes the following processing (step SD3).

In step SD3, the server control unit 20 executes the following processing with respect to the received combinations of the destination vicinity lower-level parcel file identification information and the destination vicinity lower-level parcel file version information.

That is, the server control unit 20 refers to the lower-level parcel DB 222 that corresponds to the destination vicinity lower-level parcel file identification information, and acquires one or a plurality of pieces of lower-level parcel difference data that correspond to a difference between the version of the file which the in-vehicle apparatus 3 stores (=version shown by the destination vicinity lower-level parcel file version information) and the latest version of the file that the map data management server 4 manages.

By performing the above processing, in step SD3 the server control unit 20 acquires lower-level parcel difference data that corresponds to the difference with the latest version of the file for each destination vicinity lower-level parcel file whose version is not the latest version in the in-vehicle apparatus 3.

Next, for each destination vicinity lower-level parcel file which is not the latest version, the server control unit 20 transmits a combination of the lower-level parcel file identification information, the lower-level parcel version information of the latest lower-level parcel file DPF that the map data management server 4 manages, and the lower-level parcel difference data to the in-vehicle apparatus 3 (step SD4).

As illustrated in FIG. 12A, upon receiving the data which the map data management server 4 transmitted in step SB4, the control unit 10 of the in-vehicle apparatus 3 copies, to the buffer region, each lower-level parcel file DPF to which the binary difference data that was received from the map data management server 4 is to be applied (step SC9). A lower-level parcel file DPF that is expanded in the buffer region is a lower-level parcel file DPF that corresponds to a mesh belonging to the rectangular region of approximately 10 square km that is centered on the destination that was set, and which is a lower-level parcel file DPF which is not the latest version. When copying a file to the buffer region, the control unit 10 changes the file name of the copied file in accordance with a predetermined rule so as to be different from the file name of the file that is the copy source.

Next, the control unit 10 applies the corresponding binary difference data to the respective files that were copied to the buffer region (step SC10). By means of the processing in step SC10, the version of each file expanded in the buffer region is updated, and a state is entered in which the respective files have been synchronized with the latest files that the map data management server 4 manages.

Next, the control unit 10 executes the following processing (step SC11). That is, in step SC11 the control unit 10 changes the file name of the respective files that are expanded in the buffer region to the file name of the respective files that are the copy sources, and on the other hand the control unit 10 changes the file name of the respective files that are the copy sources to the file name of the respective files that were expanded in the buffer region. Next, the control unit 10 stores the respective files that were expanded in the buffer region at the storage locations of the respective files that are the copy sources. By performing the processing in step SC11, instead of the respective files prior to version updating, the respective files after version updating become the files that are the objects of a referral by the control unit 10.

By execution of the processing in step SC11, in a case of displaying a map of the vicinity of a set destination at a scale factor of parcel scale factor level PLV2 or parcel scale factor level PLV1, the map is displayed based on the latest version of the lower-level parcel files DPF. In this connection, when a user set a destination, there are cases where a map of the vicinity of the destination is displayed in order to ascertain in advance the environment in the vicinity of the destination, and there is also a high possibility that the vehicle 2 will travel through the vicinity of the destination that was set. That is, there is a high possibility that a map of the vicinity of the destination will be displayed. In consideration of this situation, according to the above described configuration, because the map of the vicinity of the destination is displayed based on the latest version of the lower-level parcel files DPF, the user can refer to the latest map of the vicinity of the destination.

Note that, after the file name of the region file RF is changed after version updating, it is necessary to restart the in-vehicle apparatus 3 in order to enter a state in which the region file RF whose name was changed can be referred to by the control unit 10. This is because it is necessary to perform a series of processing relating to route searching using a common region file RF since, if the contents of the region file RF are changed during execution of processing relating to route searching, a situation can arise in which consistency is not achieved between processing prior to the change and processing after the change and consequently the route searching is not performed normally. On the other hand, the lower-level parcel files DPF are files that are temporarily referred to in a case where a corresponding region on a map becomes a display object. Therefore, with respect to the lower-level parcel files DPF, after a file name is changed, the file whose file name was changed instantly enters a state in which the control unit 10 can refer to the file, without restarting the in-vehicle apparatus 3. In addition, while displaying a map, the convenience of the user is not impaired even in a case where there is a change in the display contents accompanying a change in the file name of a lower-level parcel file DPF. In consideration of this fact, it is not necessary to restart the in-vehicle apparatus 3 in a case where version updating of only the lower-level parcel files DPF was performed.

Next, the control unit 10 updates the version management database 161 based on the data received from the map data management server 4 in step SC9 (step SC12). By means of the processing in step SC12, with respect to the respective files for which version updating was performed, the respective values of the version information that is managed by the version management database 161 become values that reflect the version updating (values corresponding to the versions of the respective files that the map data management server 4 manages).

As described above, in the present embodiment, the in-vehicle apparatus 3 executes processing to update the version of lower-level parcel files DPF that correspond to meshes in the vicinity of a destination by taking the fact that a destination was set as a trigger for execution of the processing. In this case, as described above, with respect to the lower-level parcel files DPF, taking establishment of the first condition as a trigger, version updating of files that correspond to the vicinity of the registered home location is performed, and not version updating of all the files en bloc. Accordingly, there is a possibility that the version of a lower-level parcel file DPF that corresponds to a region other than the vicinity of the registered home location is not the latest version. Further, according to the above described configuration, in a case where a destination is set, the version of the lower-level parcel files DPF corresponding to the vicinity of the set destination becomes the latest version of the files, and hence the version of lower-level parcel files DPF that correspond to a region for which the possibility of being displayed is high can be made the latest version with priority over updating of other files. That is, according to the present embodiment, in consideration of a fact that all the versions of the lower-level parcel files DPF are not the latest versions, utilizing the characteristic that the possibility that the vicinity of a destination will be displayed is high when a destination has been set, the versions of lower-level parcel files DPF that have a high possibility of being used can be updated in a precise manner.

<Operations of In-Vehicle Apparatus 3 and Map Data Management Server 4 Performed Taking Establishment of Third Condition as Trigger>

FIGS. 13A and 13B are flowcharts that illustrate operations of the in-vehicle apparatus 3 and the map data management server 4 in a case where a third condition that is different to the first condition and second condition is established, in which (A) shows operations of the in-vehicle apparatus 3 and (B) shows operations of the map data management server 4.

As illustrated in FIG. 13A, the control unit 10 of the in-vehicle apparatus 3 monitors whether or not a third condition is established (step SE1). One of the third conditions is that an operation to instruct execution of route searching as far as a destination was performed by the user. Another one of the third conditions is that, after route searching was performed, during guidance with respect to the retrieved route it is detected that the vehicle 2 deviated from the route and execution of an operation to search for a route again is started. The control unit 10 has a function that detects that the vehicle 2 deviated from a route during route guidance, and has a function that, in a case where the vehicle 2 deviated from a route, searches again for a route to the destination from the current position of the vehicle 2.

The control unit 10 executes the processing from step SE2 onwards taking a fact that a third condition was established as a trigger for executing the processing.

If a third condition is established (step SE1: YES), the control unit 10 makes an inquiry to the map data management server 4 about the integrated version (step SE2).

As illustrated in FIG. 13B, the server control unit 20 of the map data management server 4 acquires the integrated version which the map data management server 4 manages (step SF1).

Next, the server control unit 20 transmits information showing the integrated version that was acquired in step SF1 to the in-vehicle apparatus 3 (step SF2).

As illustrated in FIG. 13A, upon receiving the information showing the integrated version that the map data management server 4 transmitted, the control unit 10 of the in-vehicle apparatus 3 acquires the region file version information of the region file RF that the storage unit 16 stores (step SE3).

Next, the control unit 10 compares the information showing the integrated version that was received from the map data management server 4 and the region file version information that was acquired in step SE3 (step SE4), and determines whether or not the respective values of these items of information match (whether or not the versions match) (step SE5).

If the versions do not match (step SE5: NO), the control unit 10 executes the processing from step SA6 to step SA18 in the flowchart in FIG. 10A (step SE6). As described above, if the version of the region file RF that the in-vehicle apparatus 3 stores is not the latest version, there is a possibility that route searching will not be performed appropriately. Accordingly, in a case where an instruction is given to perform route searching and the version of the region file RF that the in-vehicle apparatus 3 stores is not the latest version, in comparison to continuing the processing without updating the version of the region file RF, the convenience of the user can be improved by interrupting the processing and updating the version of the region file RF. In consideration of this fact, in a case where an instruction is given to perform route searching and the version of the region file RF that the in-vehicle apparatus 3 stores is not the latest version, the control unit 10 executes the processing from step SA6 to step SA18 in the flowchart in FIG. 10A to update the version of the region file RF.

Note that, when shifting the procedure from step SE5 to step SE6, on the display panel 111, the control unit 10 may display a message to the effect that, because the map data TD is not the latest version, the processing is being interrupted to update the map data TD.

On the other hand, in step SE5, if the versions match (step SE5: YES), the control unit 10 executes an operation to search for a route from the current position to the destination based on the region data RD (step SE7). Since the version of the region data RD is the latest version, in step SE7 the control unit 10 can execute route searching appropriately based on the region data RD that is the latest version. Hereunder, a route that is retrieved by route searching is referred to as a "recommended route".

After searching for a route to the destination, the control unit 10 executes the following processing (step SE8).

FIG. 14 is a view for explaining the processing in step SE8 and which represents meshes on a map at a scale factor of parcel scale factor level PLV2 and also displays a current position, a destination, and a recommended route of the vehicle 2. Note that, in FIG. 14, the current position of the vehicle 2 is a registered home location. In FIG. 14, meshes belonging to a rectangular region of approximately 80 square km that is centered on the registered home location are represented by a dotted pattern. Further, in FIG. 14, a mesh belonging to a rectangular region of approximately 10 square km that is centered on the destination is represented by a lattice pattern.

In step SE8, the control unit 10 identifies meshes to which the recommended route belongs. In FIG. 14, meshes to which the recommended route belongs are represented by a diagonal line pattern. Next, the control unit 10 identifies the lower-level parcel file identification information of the lower-level parcel files DPF corresponding to the respective meshes that were identified. The control unit 10 then refers to the version management database 161 and acquires lower-level parcel version information corresponding to the lower-level parcel file identification information that was identified.

In the above manner, in step SE8, the control unit 10 acquires lower-level parcel file identification information and lower-level parcel version information for the respective lower-level parcel files DPF that correspond to the meshes to which the recommended route belongs.

In the following description, a lower-level parcel file DPF that corresponds to a mesh to which the recommended route belongs is described as a "recommended route lower-level parcel file", and the lower-level parcel file identification information and lower-level parcel version information of each recommended route lower-level parcel file are described as "recommended route lower-level parcel file identification information" and "recommended route lower-level parcel version information", respectively.

Next, the control unit 10 takes the respective recommended route lower-level parcel files as a processing object in sequential order of the meshes that the vehicle 2 passes through in a case where the vehicle 2 travels on the recommended route toward the destination, and executes the following processing with respect to the relevant recommended route lower-level parcel file that is taken as the processing object (step SE9). In the example in FIG. 14, with regard to a mesh M1 to a mesh M3, the control unit 10 takes these meshes as a processing object in the order of mesh M1, mesh M2 and mesh M3.

In step SE9, the control unit 10 determines whether or not the version of the recommended route lower-level parcel file that is the processing object is the latest version, based on a comparison between the recommended route lower-level parcel file identification information of the recommended route lower-level parcel file that is the processing object and the information showing the integrated version that is received in step SE3. If the version is the latest version, the control unit 10 takes the next recommended route lower-level parcel file as the processing object. If the version is not the latest version, the control unit 10 transmits a combination of the recommended route lower-level parcel file identification information and the recommended route lower-level parcel version information of the recommended route lower-level parcel file that is the processing object to the map data management server 4.

As described above, in step SE9, for each of the recommended route lower-level parcel files, the control unit 10 determines whether or not the version of the file is the latest version in the order of the meshes that the vehicle 2 will pass through when travelling on the recommended route, and if the version is not the latest version, the control unit 10 transmits a combination of the recommended route lower-level parcel file identification information and the recommended route lower-level parcel version information.

As illustrated in FIG. 13B, upon receiving the combination of the recommended route lower-level parcel file identification information and the recommended route lower-level parcel version information of the recommended route lower-level parcel file whose version is not the latest version, the server control unit 20 of the map data management server 4 executes the following processing (step SF3).

In step SF3, the server control unit 20 executes the following processing with respect to each combination of recommended route lower-level parcel file identification information and recommended route lower-level parcel version information that is received.

That is, the server control unit 20 refers to the lower-level parcel DB 222 that corresponds to the recommended route lower-level parcel file identification information, and acquires one or a plurality of pieces of lower-level parcel difference data that correspond to a difference between the version of the file which the in-vehicle apparatus 3 stores (=version indicated by the recommended route lower-level parcel file version information) and the latest version of the file that the map data management server 4 manages.

Next, the server control unit 20 transmits a combination of the corresponding lower-level parcel file identification information, lower-level parcel version information of the latest lower-level parcel file DPF that the map data management server 4 manages, and lower-level parcel difference data to the in-vehicle apparatus 3 (step SF4).

The server control unit 20 executes the processing in step SF3 and step SF4 each time a combination of recommended route lower-level parcel file identification information and recommended route lower-level parcel version information is received. As a result, a combination of lower-level parcel file identification information, lower-level parcel version information of the latest lower-level parcel file DPF that the map data management server 4 manages, and lower-level parcel difference data is transmitted from the map data management server 4 to the in-vehicle apparatus 3 in the order of the meshes that the vehicle 2 passes through when travelling on the recommended route.

As illustrated in FIG. 13A, upon receiving the combination of the lower-level parcel difference data, lower-level parcel file identification information and lower-level parcel version information which the map data management server 4 transmitted in step SF4, the control unit 10 of the in-vehicle apparatus 3 executes the following processing (step SE10). That is, the control unit 10 copies a lower-level parcel file DPF corresponding to the lower-level parcel file identification information to the buffer region (step SE10). When copying a file to the buffer region, the control unit 10 changes the file name of the copied file in accordance with a predetermined rule so as to be different from the file name of the file that is the copy source.

Next, the control unit 10 applies the received binary difference data to the lower-level parcel file DPF that was copied to the buffer region (step SE11). By the processing in step SE11, the version of the lower-level parcel file DPF expanded in the buffer region is updated, and enters a state in which the file is synchronized with the latest version of the file that the map data management server 4 manages.

Next, the control unit 10 executes the following processing (step SE12). That is, in step SE12, the control unit 10 changes the file name of the lower-level parcel file DPF expanded in the buffer region to the file name of the file that is the copy source, and on the other hand changes the file name of the file that is the copy source to the file name of the file that was expanded in the buffer region. Next, the control unit 10 stores the lower-level parcel file DPF that was expanded in the buffer region at the storage location of the file that is the copy source. By the processing in step SE12, instead of the lower-level parcel file DPF before version updating, the lower-level parcel file DPF after version updating becomes the file that is the object objects of a referral by the control unit 10.

Next, the control unit 10 updates the version management database 161 based on the data received from the map data management server 4 in step SE10 (step SE13). By performing the processing in step SE13, with respect to the lower-level parcel file DPF for which version updating was performed, the value of the version information that is managed by the version management database 161 becomes a value that reflects the version updating operation (a value corresponding to the version of the file managed by the map data management server 4).

The control unit 10 executes the processing from step SE10 to step SE13 each time a combination of the lower-level parcel difference data, the lower-level parcel file identification information and the lower-level parcel version information that the map data management server 4 transmits in step SF4 is received. As a result, version updating of recommended route lower-level parcel files whose version is not the latest version is performed in the order of the meshes that the vehicle 2 passes through when travelling on the recommended route, and the updated files can be referred to by the control unit 10.

Thus, with respect to recommended route lower-level parcel files whose version is not the latest version, since version updating of the files is performed in the order of the meshes that the vehicle 2 passes through when travelling on the recommended route, and the updated files can be referred to by the control unit 10, the following advantageous effects are obtained.

That is, because version updating of the lower-level parcel files DPF is performed in the order of the meshes that the vehicle 2 passes through when travelling on the recommended route, before the vehicle 2 passes through a mesh, version updating of a lower-level parcel file DPF that corresponds to the mesh in question can be completed with a higher probability in comparison to a case where version updating is not performed in such order. Therefore, during route guidance, although fundamentally a state is entered in which a map that is centered on the vehicle 2 is displayed on the display panel 111, the map that is displayed that is centered on the vehicle 2 can be made a map that is based on the latest version of the lower-level parcel file DPF.

Further, as has been described using the flowchart in FIGS. 12A and 12B, in the present embodiment the versions of lower-level parcel files DPF corresponding to meshes in the vicinity of the registered home location are made the latest versions. Further, there are many cases where the user proceeds towards a destination from the user's home, and therefore there is the characteristic that that are many cases where the current position of the vehicle 2 at a time that an instruction is given to execute route searching is the registered home location. In a case where the processing in the flowchart in FIGS. 13A and 13B is performed and version updating of the lower-level parcel file DPF is performed based on a recommended route that is searched for taking the home location as the current position of the vehicle 2, because the lower-level parcel files DPF for the vicinity of the home location (current position of the vehicle 2) are already the latest versions of the files, the map that is displayed on the display panel 111 immediately after the start of route guidance can be made a map that is based on lower-level parcel files DPF that are the latest versions of the files. In addition, during a period in which the vehicle 2 is located in an approximately 80-km area that is centered on the registered home location, recommended route lower-level parcel files whose respective versions are not the latest version can be subjected to version updating in sequential order. Therefore, at a time that the vehicle 2 which travels on the recommended route leaves from the approximately 80-km area that is centered on the registered home location, it is possible to ensure with a high probability that the state will be one in which version updating is completed for a lower-level parcel file DPF that corresponds to a mesh that the vehicle 2 enters.

As described above, in the present embodiment, the in-vehicle apparatus 3 executes version updating for lower-level parcel files DPF of meshes to which the recommended route belongs, by taking as a trigger for executing the version updating a fact that an instruction was given to execute route searching or that an operation to search for a route again was started. In this case, as described above, with respect to the lower-level parcel files DPF, taking establishment of the first condition as a trigger, version updating of files that correspond to the vicinity of the registered home location is performed, and not version updating of all the files en bloc. Accordingly, there is a possibility that the version of a lower-level parcel file DPF that corresponds to a region other than the vicinity of the registered home location is not the latest version. Further, according to the above described configuration, in a case where route searching is performed, since the version of the lower-level parcel files DPF to which the recommended route that was retrieved by the route searching belongs becomes the latest version, the version of lower-level parcel files DPF corresponding to a region for which the possibility of being displayed is high can be made the latest version with priority over updating of other files. That is, according to the present embodiment, in consideration of a fact that all the versions of the lower-level parcel files DPF are not the latest versions, in a case where route searching is performed, by utilizing the characteristic that the possibility that a map along the recommended route will be displayed is high, the versions of lower-level parcel files DPF that have a high possibility of being used can be updated in a precise manner.

<Operations of In-Vehicle Apparatus 3 and Map Data Management Server 4 Performed Taking Establishment of Fourth Condition as Trigger>

Figure 15A:
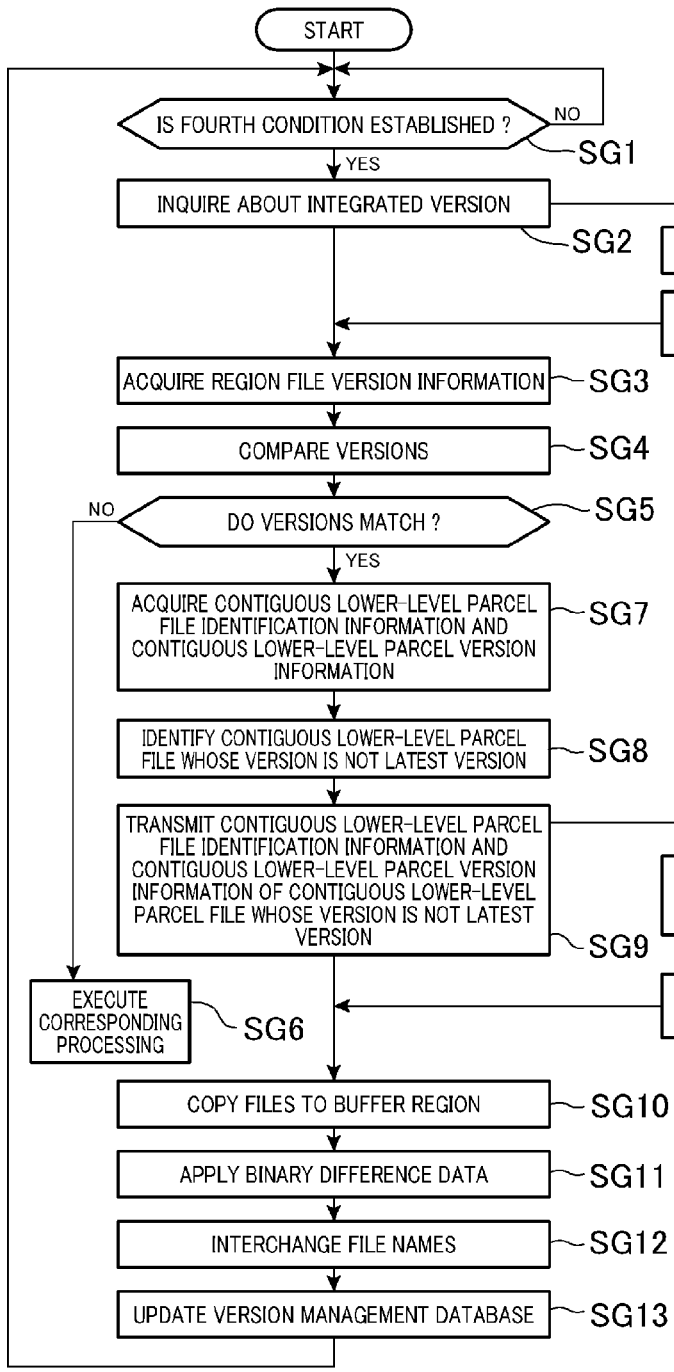
FIGS. 15A and 15B are flowcharts illustrating operations of the in-vehicle apparatus and the map data management server, respectively.
Figure 15B:
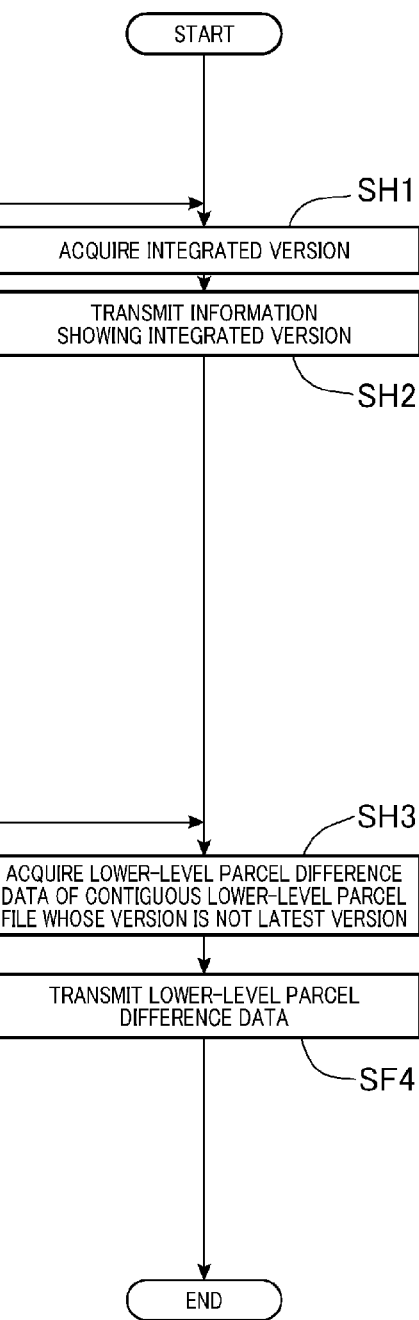

FIGS. 15(A) and 15(B) are flowcharts that illustrate operations of the in-vehicle apparatus 3 and the map data management server 4 in a case where a fourth condition that is different to the first condition, second condition and third condition is established, in which (A) shows operations of the in-vehicle apparatus 3 and (B) shows operations of the map data management server 4.

It is assumed that the vehicle 2 is moving at the time point when the operations in the flowcharts in FIGS. 15A and 15B start. The in-vehicle apparatus 3 may be in the process of performing route guidance or not in the process of performing route guidance.

As illustrated in FIG. 15A, while the vehicle 2 is moving, the control unit 10 of the in-vehicle apparatus 3 monitors whether or not the vehicle 2 passed through a boundary between meshes in a map at the scale factor of parcel scale factor level PLV2 (hereunder, referred to as "second level parcel mesh") (step SG1). Passage of the vehicle 2 through a boundary between second level parcel meshes means that the vehicle 2 that had been located in one second level parcel mesh entered another second level parcel mesh. The control unit 10 manages the respective regions of the second level parcel meshes, and executes the processing in step SG1 based on the positional relation between the current position of the vehicle 2 and the second level parcel meshes.

A fact that the vehicle 2 passed through a second level parcel mesh corresponds to the fourth condition, and the control unit 10 executes the processing from step SG2 onwards taking the fact that the fourth condition was established as a trigger.

In a case where it is detected that the vehicle 2 passes through a boundary between second level parcel meshes (step SG1: YES), the control unit 10 makes an inquiry to the map data management server 4 about the integrated version (step SG2).

As illustrated in FIG. 15B, the server control unit 20 of the map data management server 4 acquires the integrated version which the map data management server 4 manages (step SH1).

Next, the server control unit 20 transmits information showing the integrated version that was acquired in step SH1 to the in-vehicle apparatus 3 (step SH2).

As illustrated in FIG. 15A, upon receiving the information showing the integrated version that the map data management server 4 transmitted, the control unit 10 of the in-vehicle apparatus 3 acquires the region file version information of the region file RF that the storage unit 16 stores (step SG3).

Next, the control unit 10 compares the information showing the integrated version that was received from the map data management server 4 and the region file version information that was acquired in step SG3 (step SG4), and determines whether or not the respective values of these items of information match (whether or not the versions match) (step SG5).

If the versions do not match (step SG5: NO), the control unit 10 executes the processing from step SA6 to step SA18 in the flowchart in FIG. 10A (step SG6). When shifting the procedure from step SG5 to step SG6, on the display panel 111, the control unit 10 may display a message to the effect that, because the map data TD is not the latest version thereof, the processing is being interrupted to update the map data TD.

On the other hand, in step SG5, if the versions match (step SG5: YES), the control unit 10 executes the following processing (step SG7).

Figure 16:
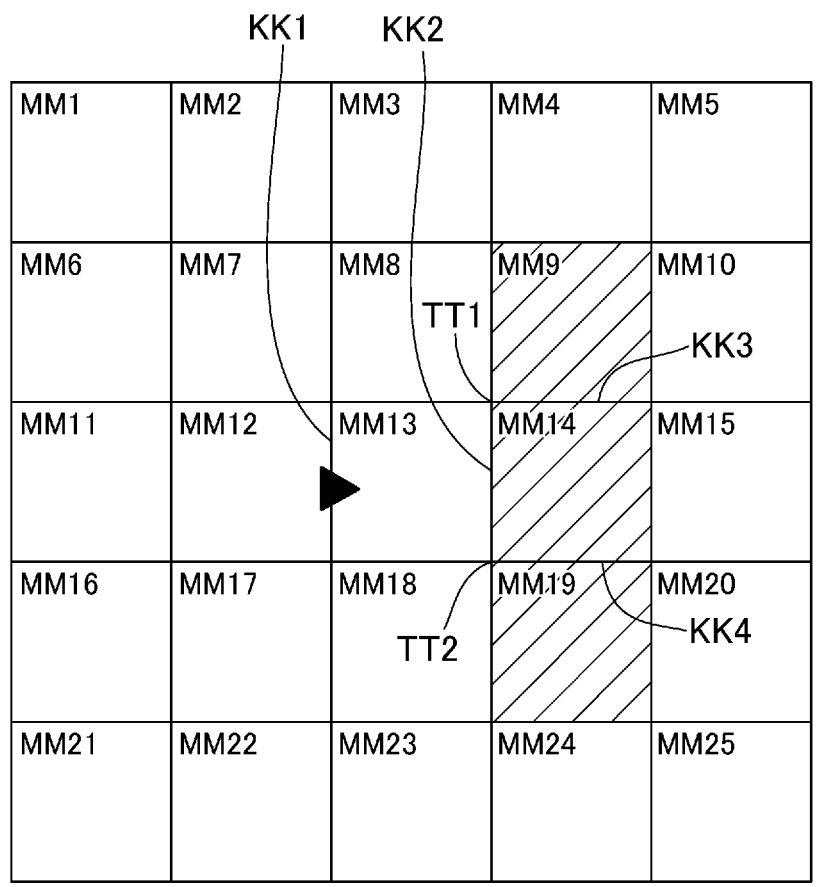
FIG. 16 is a view which illustrates 25 second level parcel meshes that are second level parcel meshes MM1 to MM25, and a current position of a vehicle.

FIG. 16 is a view for describing the processing in step SG7, and illustrates 25 second level parcel meshes that are second level parcel meshes MM1 to MM25, and a current position of the vehicle 2.

In step SG7, the control unit 10 identifies three second level parcel meshes that are located in the travelling direction of the vehicle 2, in a manner that sandwiches a second level parcel mesh that the vehicle 2 newly entered therebetween. More specifically, the control unit 10 identifies a boundary that the vehicle 2 passed through and a second level parcel mesh that contacts a boundary on the opposite side in the second level parcel mesh that the vehicle 2 newly entered. In addition, the control unit 10 identifies two second level parcel meshes that contact two boundaries (sides) that, through a vertex, contact a boundary on the relevant opposite side in the second level parcel mesh that was identified. Hereunder, the processing in step SG7 will be described by way of an example using FIG. 16.

As illustrated in FIG. 16, it is assumed that the vehicle 2 that had been located inside a second level parcel mesh MM12 passed through a boundary KK1 between the second level parcel mesh MM12 and a second level parcel mesh MM13. In this case, the control unit 10 identifies a boundary KK2 that is a boundary on the opposite side to the boundary KK1 in the second level parcel mesh MM13 which the vehicle 2 newly entered. Next, the control unit 10 identifies a second level parcel mesh MM14 that is a second level parcel mesh that contacts the boundary KK2. Next, the control unit 10 identifies a boundary KK3 and a boundary KK4 which are two boundaries that contact the boundary KK2 through a vertex TT1 and a vertex TT2 in the second level parcel mesh MM14. Next, the control unit 10 identifies a second level parcel mesh MM9 and a second level parcel mesh MM19 that are two second level parcel meshes that contact the boundary KK3 and the boundary KK4. Thus, the control unit 10 identifies three second level parcel meshes that are located in the travelling direction of the vehicle 2, in a manner that sandwiches the second level parcel mesh which the vehicle 2 newly entered. In FIG. 16, the identified second level parcel meshes are indicated by a diagonal line pattern.

In addition, in step SG7, the control unit 10 identifies lower-level parcel file identification information of lower-level parcel files DPF that correspond to the three second level parcel meshes that were identified. Further, the control unit 10 refers to the version management database 161 and acquires lower-level parcel version information for each file corresponding to the three pieces of lower-level parcel file identification information that were identified.

In the following description, a lower-level parcel file DPF that is identified in step SG7 is described as a "contiguous lower-level parcel file", and lower-level parcel file identification information and lower-level parcel version information of a contiguous lower-level parcel file are described as "contiguous lower-level parcel file identification information" and "contiguous lower-level parcel version information", respectively.

Next, the control unit 10 executes the following processing (step SG8). That is, the control unit 10 identifies contiguous lower-level parcel files whose version is not the latest version, based on a comparison between the information showing the integrated version that was received in step SG3 and the three items of contiguous lower-level parcel version information.

Next, for each contiguous lower-level parcel file whose version is not the latest version that was identified in step SG8, the control unit 10 transmits a combination of the contiguous lower-level parcel file identification information and the contiguous lower-level parcel version information to the map data management server 4 (step SG9).

As illustrated in FIG. 15B, the server control unit 20 of the map data management server 4 receives the combination of the contiguous lower-level parcel file identification information and the contiguous lower-level parcel version information of the contiguous lower-level parcel file whose version is not the latest version, and executes the following processing (step SH3). That is, the server control unit 20 refers to the lower-level parcel DB 222 that corresponds to the contiguous lower-level parcel file identification information that is received. Next, based on the lower-level parcel DB 222 that was referred to, the server control unit 20 acquire each item of lower-level parcel difference data that corresponds to a difference between the contiguous lower-level parcel version information and the latest version of the lower-level parcel file DPF that the map data management server 4 manages.

Next, for each contiguous lower-level parcel file whose version is not the latest version, the server control unit 20 transmits a combination the lower-level parcel difference data, the lower-level parcel file identification information and the lower-level parcel version information of the latest version of the lower-level parcel file DPF that the map data management server 4 manages to the in-vehicle apparatus 3 (step SH4).

As illustrated in FIG. 13A, upon receiving the combination of the lower-level parcel difference data, the lower-level parcel file identification information and the lower-level parcel version information that the map data management server 4 transmitted in step SH4, the control unit 10 of the in-vehicle apparatus 3 executes the following processing (step SG10). That is, the control unit 10 copies a lower-level parcel file DPF that corresponds to the lower-level parcel file identification information to the buffer region. The lower-level parcel file DPF that is copied to the buffer region is a contiguous lower-level parcel file whose version is not the latest version. When copying a file to the buffer region, the control unit 10 changes the file name of the copied file in accordance with a predetermined rule so as to be different from the file name of the file that is the copy source.

Next, the control unit 10 applies the received binary difference data to the lower-level parcel file DPF that was copied to the buffer region (step SG11). By the processing in step SG11, the version of the contiguous lower-level parcel file whose version is not the latest version is updated, and a state is entered in which the contiguous lower-level parcel file has been synchronized with the latest version of the file that the map data management server 4 manages.

Next, the control unit 10 executes the following processing (step SG12). That is, the control unit 10 changes the file name of the lower-level parcel file DPF expanded in the buffer region to the file name of the file that is the copy source, and on the other hand changes the file name of the file that is the copy source to the file name of the file that was expanded in the buffer region. Next, the control unit 10 stores the lower-level parcel file DPF that was expanded in the buffer region at the storage location of the file that is the copy source. By the processing in step SG12, instead of the contiguous lower-level parcel file before version updating, the contiguous lower-level parcel file after version updating becomes the file that is the object objects of a referral by the control unit 10.

Next, the control unit 10 updates the version management database 161 based on the data received from the map data management server 4 in step SG10 (step SG13). By the processing in step SG13, with respect to the lower-level parcel file DPF for which version updating was performed, the value of the version information that is managed by the version management database 161 becomes a value that reflects the version updating operation (a value corresponding to the version of the file managed by the map data management server 4).

After executing the processing in step SG13, the control unit 10 returns the procedure to step SG1, and monitors whether or not the vehicle 2 passed through a boundary between second level parcel meshes.

FIGS. 17(A) to 17(I) are views for describing an example of the processing results of the flowcharts in FIGS. 15A and 15B.

Each view in FIGS. 17A to 17I illustrates 25 second level parcel meshes that are the second level parcel meshes MM1 to MM25, and the current position of the vehicle 2.

As illustrated in FIG. 17A, it is assumed that the vehicle 2 is located in the second level parcel mesh MM1. Further, as illustrated in FIG. 17A, it is assumed that the vehicle 2 travels on a route SS. In this case, as a result of the processing in the flowcharts in FIGS. 15A and 15B being performed by the in-vehicle apparatus 3 and the map data management server 4, lower-level parcel files DPF are subjected to version updating in the following manner. Note that, in FIGS. 17A to 17I, a lower-level parcel mesh that corresponds to the latest version of a lower-level parcel file DPF is represented by a blackened pattern, and a mesh that is taken as an object of version updating taking a fact that the vehicle 2 passed through a boundary as a trigger is represented by a diagonal line pattern.

As illustrated in FIG. 17B, when the vehicle 2 passes through a boundary L1, second level parcel meshes MM3 and MM8 become objects of version updating, and the versions of lower-level parcel files DPF corresponding to the second level parcel meshes MM3 and MM8 are updated.

As illustrated in FIG. 17C, when the vehicle 2 passes through a boundary L2, second level parcel meshes MM11, MM12 and MM13 become objects of version updating, and the versions of lower-level parcel files DPF corresponding to the second level parcel meshes MM11, MM12 and MM13 are updated.

As illustrated in FIG. 17D, when the vehicle 2 passes through a boundary L3, second level parcel meshes MM4, MM9 and MM11 become objects of version updating, and the versions of lower-level parcel files DPF corresponding to the second level parcel meshes MM4, MM9 and MM11 are updated.

As illustrated in FIG. 17E, when the vehicle 2 passes through a boundary L4, second level parcel meshes MM17, MM18 and MM19 become objects of version updating, and the versions of lower-level parcel files DPF corresponding to the second level parcel meshes MM17, MM18 and MM19 are updated.

As illustrated in FIG. 17F, when the vehicle 2 passes through a boundary L5, second level parcel meshes MM10, MM15 and MM20 become objects of version updating, and the versions of lower-level parcel files DPF corresponding to the second level parcel meshes MM10, MM15 and MM20 are updated.

As illustrated in FIG. 17G, when the vehicle 2 passes through a boundary L6, second level parcel meshes MM23, MM24 and MM25 become objects of version updating, and the versions of lower-level parcel files DPF corresponding to the second level parcel meshes MM23, MM24 and MM25 are updated.

As illustrated in FIG. 17H, when the vehicle 2 passes through a boundary L7, a second level parcel mesh MM22 becomes the object of version updating, and the version of a lower-level parcel file DPF corresponding thereto is updated. Note that, since the second level parcel meshes MM12 and MM17 are the latest versions for which version updating was already performed, in the processing in step SG8 it is determined that the versions of the files corresponding to the second level parcel meshes MM12 and MM17 are the latest versions and version updating is not performed.

As illustrated in FIG. 17I, when the vehicle 2 passes through a boundary L8, second level parcel meshes MM 16 and MM21 becomes the object of version updating, and the versions of lower-level parcel files DPF corresponding to the second level parcel meshes MM 16 and MM21 are updated. Note that, since the second level parcel meshes MM11 is the latest version for which version updating was already performed, version updating is not performed.

As described above, in the present embodiment, taking a fact that the in-vehicle apparatus 3 passed through a boundary between second level parcel meshes as a trigger, the control unit 10 of the in-vehicle apparatus 3 identifies the boundary that the vehicle 2 passed through and a second level parcel mesh (hereunder, referred to as "main mesh") that contacts a boundary on the opposite side in the second level parcel mesh that the vehicle 2 newly entered, and also identifies second level parcel meshes that are contiguous to the main mesh (hereunder, referred to as "sub-mesh"). The main mesh is a second level parcel mesh for which the possibility that the vehicle 2 will pass therethrough is high based on the relation with the travelling direction of the vehicle 2. The sub-meshes are second level parcel meshes for which the possibility of being displayed on the map in a case where the vehicle 2 passes through the main mesh is high. The control unit 10 takes the main mesh and the two sub-meshes as objects of version updating, and updates the versions if the respective versions thereof are not the latest versions. Because this configuration is adopted, while the vehicle 2 is travelling, the in-vehicle apparatus 3 can take into consideration the travelling direction of the vehicle 2 and prioritize updating of the versions of the lower-level parcel files DPF that correspond to second level parcel meshes for which the possibility of being displayed as a map is high. That is, according to the present embodiment, in consideration of a fact that all the versions of the lower-level parcel files DPF are not the latest versions, while the vehicle 2 is travelling, version updating can be performed that prioritizes updating of the versions of the lower-level parcel files DPF for which the possibility of being used is high, in a manner that reflects the travelling direction of the vehicle 2.

Note that, the reasons that the main mesh alone is not taken as an object of version updating are as follows. That is, if the main mesh alone is taken as an object of version updating, in a case where the vehicle 2 travels over an edge of the main mesh, at the border between the main mesh and another mesh a deviation can arise that is due to a difference between the versions of the lower-level parcel files DPF. Furthermore, when travelling over an edge of the main mesh, if the vehicle 2 suddenly enters a mesh whose version is not the latest version, version updating of the lower-level parcel file DPF corresponding to the mesh which the vehicle 2 entered will not be performed in time.

According to the present embodiment, by the time that the vehicle 2 arrives at the next mesh, the version of the lower-level parcel file DPF corresponding to the mesh that the vehicle 2 is predicted to arrive at can be updated in advance to the latest version, and thus the occurrence of deviations at borders between meshes such as roads that are displayed on the map that are caused by mixing of new and old versions of the lower-level parcel files DPF can be suppressed.

In particular, according to the present embodiment, by performing the processing of the flowcharts in FIGS. 15A and 15B, even in a situation in which route searching is not performed, version updating of appropriate lower-level parcel files DPF can be performed.

In addition, by performance of the processing in the flowcharts in FIGS. 15A and 15B, the following advantageous effects can be obtained with respect to route guidance that is performed after route searching.

FIG. 18 is a view illustrating second level parcel meshes for which the versions of corresponding lower-level parcel files DPF are updated in accordance with travel of the vehicle 2 on the recommended route on the map illustrated in FIG. 14. In FIG. 18, lower-level parcel meshes that become an object of version updating by performance of the processing in the flowcharts in FIGS. 15A and 15B during travel along the recommended route are represented by a vertical line pattern.

As illustrated in FIG. 18, in a case where the vehicle 2 travels along the recommended route, by performance of the processing in the flowchart in FIGS. 13A and 13B, version updating is performed with respect to files that correspond to second level parcel meshes to which the recommended route belongs. In addition, by performance of the processing in the flowcharts in FIGS. 15A and 15B, in accordance with travel of the vehicle 2, version updating is performed with respect to files corresponding to second level parcel meshes that are contiguous to the second level parcel meshes to which the recommended route belongs. In this case, during route guidance, although the user basically drives the vehicle 2 along the recommended route, in some cases the user drives the vehicle 2 off from the recommended route due to reasons such as taking a rest, having a meal or shopping. According to the present embodiment, in such cases also, a map of the vicinity of the recommended route can be displayed based on lower-level parcel files DPF that are the latest versions, and thus the convenience of the user can be enhanced.

As described above, the in-vehicle apparatus 3 according to the present embodiment includes: the storage unit 16 that stores the parcel data PD that is constituted by a plurality of files and the region data RD that is constituted by a single file; and the control unit 10 that, when performing version updating with respect to the region data RD and the parcel data PD, updates the version of the region data RD by updating the single file (single region file RF) constituting the data of the region data RD, and updates the version of the parcel data PD by updating some files among the plurality of files (one upper-level parcel file UPF and a plurality of lower-level parcel files DPF) constituting the data of the parcel data PD.

According to this configuration, with respect to the region data RD, because all the data is updated en bloc in a unified manner to the new version, deviations between the generations of versions for respective meshes and the occurrence of a situation in which route searching is not performed normally can be prevented. Further, with respect to the parcel data PD, because some of the files are subjected to version updating, when performing version updating the amount of data that is exchanged between the in-vehicle apparatus 3 and the map data management server 4 can be reduced.

Further, in the present embodiment, when a predetermined condition is established, the control unit 10 updates the version of the region file RF.

According to this configuration, taking the establishment of a predetermined condition as a trigger, the version of the region file RF is updated, and a situation in which route searching after the predetermined condition is established is not performed normally can be prevented.

Further, in the present embodiment, the control unit 10 updates the version of the region file RF by taking a fact that the ACC power source was turned on (the power was turned on) as a trigger.

According to this configuration, a situation in which route searching after the ACC power source is turned on and the in-vehicle apparatus 3 starts is not performed normally can be prevented.

Further, in the present embodiment, the parcel data PD includes a plurality of items of level parcel data that are in accordance with scale factors, with the level parcel data for a small scale factor being constituted by a single file (a single upper-level parcel file UPF), and the level parcel data for a large scale factor being constituted by a plurality of files (a plurality of lower-level parcel files DPF).

According to this configuration, the parcel data PD can be constituted by files that correspond to a characteristic of having a plurality of items of level parcel data in accordance with differences between the levels of scale factors.

Further, in the present embodiment, when a predetermined condition is established, the control unit 10 updates the region file RF and the upper-level parcel file UPF, or updates some files among a plurality of files constituting the lower-level parcel files DPF.

According to this configuration, with respect to the region data RD and the upper-level parcel file UPF, because all the data is updated en bloc in a unified manner to the new version, route searching can be performed normally and maps having consistency with respect to maps at a small scale factor can be displayed. Note that, the data amount of the upper-level parcel file UPF is small in comparison to the plurality of lower-level parcel files DPF, and accordingly the amount of the corresponding binary difference data is also small and thus an increase in the amount of data that is communicated accompanying en-bloc updating of the version of the upper-level parcel file UPF is limited. Further, according to the above described configuration, with respect to the lower-level parcel files DPF, because some of the files are updated, the amount of data that is communicated can be effectively reduced in a manner that takes into consideration the characteristic that the number of lower-level parcel files DPF is large and the data amount is also large.

The in-vehicle apparatus 3 according to the present embodiment is configured so that a home location can be registered. Further, with respect to the lower-level parcel files DPF, the control unit 10 performs version updating of a file that corresponds to a registered home location.

According to this configuration, in consideration of the characteristic that the vehicle 2 waits at the registered home location and the possibility that the vehicle 2 will travel in the vicinity of the registered home location is high, the versions of lower-level parcel files DPF for which the possibility of being used is high can be updated with priority over updating of other files.

Further, the in-vehicle apparatus 3 according to the present embodiment is configured so that a destination can be set. With respect to the lower-level parcel files DPF, the control unit 10 performs version updating of files that correspond to a set destination.

According to this configuration, when a destination was set, in consideration of the characteristic that the possibility that the vehicle 2 will travel through the vicinity of the destination is high, and that the possibility that the user will cause a map of the vicinity of the destination to be displayed is high, the versions of lower-level parcel files DPF for which the possibility of being used is high can be updated with priority over updating of other files.

Further, the in-vehicle apparatus 3 according to the present embodiment has a function that searches for a route. Further, for the lower-level parcel files DPF, the control unit 10 performs version updating with respect to files that corresponds to a retrieved route (recommended route).

According to this configuration, in consideration of the characteristic that the possibility of the vehicle 2 travelling along a recommended route that was retrieved is high, version updating of lower-level parcel files DPF for which the possibility of being used is high can be performed with priority over updating of other files.

Also, in the present embodiment the control unit 10 of the in-vehicle apparatus 3 makes an inquiry to the map data management server 4 about the latest version of the region file RF (=integrated version), and if the version of the region file RF that the storage unit 16 stores is not the latest version, the control unit 10 updates the region file RF to the latest version.

According to this configuration, if the version of the region file RF that is stored in the in-vehicle apparatus 3 is not the latest version, the version can be made the latest version.

Further, in the present embodiment, the control unit 10 of the in-vehicle apparatus 3 receives region file difference data (difference data) showing the difference between the latest version of the region file RF and the region file RF that the storage unit 16 stores from the map data management server 4, and performs version updating with respect to the region file RF based on the region file difference data that is received.

According to this configuration, the amount of data that is exchanged between the in-vehicle apparatus 3 and the map data management server 4 can be reduced.

Further, the in-vehicle apparatus 3 according to the present embodiment includes the storage unit 16 that stores the parcel data PD constituted by a plurality of files (a plurality of lower-level parcel files DPF) in accordance with the meshes of a map, and the control unit 10 that, in a case where the vehicle 2 enters one of the meshes of the map, updates the versions of the lower-level parcel files DPF that correspond to meshes at the periphery of the relevant one mesh.

According to this configuration, even in a state in which route searching is not being performed (also in a case where there is no route), version updating of lower-level parcel files DPF can be appropriately performed (the map can be updated). Further, according to the above described configuration, the versions of lower-level parcel files DPF corresponding to meshes for which the possibility of the vehicle 2 travelling therethrough or of being displayed as a map is high can be updated with priority over updating of other files.

In the present embodiment, with respect to the lower-level parcel files DPF, when the vehicle 2 enters a single mesh of the map, the control unit 10 updates files corresponding to meshes at the periphery of the single mesh in question.

According to this configuration, with respect to the lower-level parcel files DPF for which the number of files is large and the data amount is also large, after reducing the amount of communication data by not performing version updating of all the lower-level parcel files DPF, the versions of lower-level parcel files DPF that correspond to meshes for which the possibility of the vehicle travelling therethrough or of being displayed as a map is high can be updated with priority over updating of other files.

Further, in the present embodiment, when the vehicle 2 enters a single mesh the control unit 10 updates files corresponding to meshes at locations that correspond to the travelling direction of the vehicle 2 when entering the single mesh in question.

According to this configuration, the versions of lower-level parcel files DPF corresponding to meshes for which the possibility of the vehicle 2 travelling therethrough or of being displayed as a map is high can be updated with priority over updating of other files more precisely by taking into consideration the travelling direction of the vehicle 2.

Further, in the present embodiment, when the vehicle 2 enters a single mesh, the control unit 10 updates the lower-level parcel files DPF that correspond to a mesh that contacts a boundary (side) that faces a boundary (side) which the vehicle 2 passed through in the single mesh in question.

According to this configuration, the versions of lower-level parcel files DPF corresponding to meshes for which the possibility of the vehicle 2 travelling therethrough or of being displayed as a map is high can be updated with priority over updating of other files more precisely by taking into consideration the travelling direction of the vehicle 2.

Further, in the present embodiment, when the vehicle 2 enters a single mesh, the control unit 10 updates lower-level parcel files DPF which correspond to a mesh that contacts a side facing a side which the vehicle 2 passed through in the relevant single mesh and lower-level parcel files DPF which correspond to meshes that are contiguous to the mesh in question.

According to this configuration, the versions of lower-level parcel files DPF corresponding to meshes for which the possibility of the vehicle 2 travelling therethrough or of being displayed as a map is high can be updated with priority over updating of other files more precisely by taking into consideration the travelling direction of the vehicle 2.

The above-described embodiment merely illustrates one aspect of the present invention, and thus any modification and application may be made within the scope of the present invention.

For example, the processing units in the flowcharts that are described using the drawings are units obtained by dividing the processing according to the main processing contents in order to facilitate understanding of the processing of the control unit 10 and the server control unit 20. The invention of the present application is not limited by the manner in which the processing units are divided or the names thereof. The processing of the control unit 10 and the server control unit 20 can also be divided into a larger number of processing units in accordance with the processing contents. The processing of the control unit 10 and the server control unit 20 can also be divided so that a single processing unit includes more processing. Further, as long as similar processing can be performed, the order of processing in the above described flowcharts is not limited to the examples illustrated in the drawings.

Furthermore, for example, although examples of the structures of databases and data are described in the above described embodiment, the structures of the databases and data are not limited to the structures exemplified above.

Further, for example, although in the above described embodiment the in-vehicle apparatus 3 communicates with the map data management server 4 through the portable terminal 5, a configuration may also be adopted in which a function that accesses the network N is provided in the in-vehicle apparatus 3, and the in-vehicle apparatus 3 communicates directly with the map data management server 4.

In addition, for example, although the in-vehicle apparatus 3 of the above described embodiment communicates with the portable terminal 5 by short-range radio communication such as Bluetooth to access the network N, a configuration may instead be adopted in which the in-vehicle apparatus 3 communicates with the portable terminal 5 via a wireless LAN to access the network N. Furthermore, a communication module having a function that accesses the network N may be applied instead of the portable terminal 5.

Further, for example, although in the above described embodiment, parcel data PD for a region of rectangular region of approximately 80 square km that is centered on a home location (more specifically, a group of 8×8 meshes composed of a mesh to which the home location belongs and a mesh group at the periphery thereof from among the mesh group of the parcel scale factor level PLV2) is taken as an updating object by taking a fact that the ACC power source is turned on as a trigger, these numerical values may be appropriately changed.

Further, for example, although in the above described embodiment the lower-level parcel file DPF includes four pieces of first level mesh parcel data MP1 and a single piece of second level mesh parcel data MP2, this is because if the second level mesh parcel data MP2 were also included in the upper-level parcel file UPF, the size thereof would be too large from the viewpoint of the capacity of the currently prevailing communication lines. However, a configuration may also be adopted in which the second level mesh parcel data MP2 is included in the upper-level parcel file UPF, and the lower-level parcel file DPF is constituted by one or a plurality (for example, four) of pieces of the first level mesh parcel data MP1.

Further, for example, with respect to the parcel data PD, the respective items of mesh data for each level parcel data item may be constituted by a single file. That is, each item of first level mesh parcel data MP1, each item of second level mesh parcel data MP2, each item of third level mesh parcel data MP3, each item of fourth level mesh parcel data MP4 and each item of fifth level mesh parcel data MP5 may be constituted by a single file.

Further, for example, although in the above described embodiment a configuration is adopted in which five levels of data, namely, the first level parcel data PD1 to the fifth level parcel data PD5 (in other words, level parcel data of five levels), are provided as level parcel data, the number of levels of the data may be changed as appropriate. Likewise, although a configuration is adopted in which four levels of data, namely, the first level region data RD1 to the fourth level region data RD4 (in other words, level region data of four levels) are provided as the level region data, the number of levels of the data may also be changed as appropriate.

Further, for example, although the number of meshes that the fifth level parcel data PD5 includes is taken as one, the number may also be changed as appropriate. Note that, the number of meshes which other level parcel data includes and the number of meshes which the level region data includes may also be changed as appropriate.

REFERENCE SIGNS LIST

1 Map Data Management System
2 Vehicle
3 In-vehicle Apparatus
4 Map Data Management Server (Information Processing Apparatus)
10 Control Unit
16 Storage Unit
RD Region Data
PD Parcel Data

The invention claimed is:

1. An in-vehicle apparatus that is mounted in a vehicle, comprising:
   a memory storing parcel data and version information; and
   a CPU connecting with the memory and updating the parcel data and the version information,
   wherein the parcel data is constituted by a plurality of files in accordance with meshes of a map,
   the parcel data includes a plurality of level parcel data items in accordance with scale factors,
   a plurality of level parcel data items for which a scale factor is small and different is constituted by an upper-level parcel file as a single file,
   at least one of the plurality of the level parcel data items for which a scale factor is large is constituted by a plurality of lower-level parcel files, and
   the version information is for the upper-level parcel file and each of the plurality of lower-level parcel files,
   wherein in a case where a predetermined condition is established, the CPU updates the plurality of level parcel data items, for which a scale factor is small and different, all at once by updating the upper-level parcel file stored in the memory based on the version information of the upper-level parcel file, and
   wherein in a case where the vehicle enters one mesh of a map, the CPU updates a lower-level parcel file stored in the memory corresponding to a mesh at a periphery of the one mesh based on version information of the lower-level parcel.

2. The in-vehicle apparatus according to claim 1, wherein in a case where the vehicle enters one mesh, the CPU updates a file corresponding to a mesh at a position that corresponds to a travelling direction when the vehicle enters the one mesh.

3. The in-vehicle apparatus according to claim 2, wherein in a case where the vehicle enters one mesh, the CPU updates a file corresponding to a mesh that contacts a side which faces a side that the vehicle passes through in the one mesh.

4. The in-vehicle apparatus according to claim 3, wherein in a case where the vehicle enters one mesh, the CPU updates a file corresponding to a mesh that contacts a side which faces a side that the vehicle passes through in the one mesh and a file corresponding to a mesh which is contiguous to the mesh.

5. A map data management system comprising:
an in-vehicle apparatus mounted in a vehicle; and
a first CPU communicating with the in-vehicle apparatus,
wherein the in-vehicle apparatus includes
a memory storing parcel data and version information, and
a second CPU connecting with the memory and updating the parcel data and the version information,
wherein the parcel data is constituted by a plurality of files in accordance with meshes of a map,
the parcel data includes a plurality of level parcel data items in accordance with scale factors,
 a plurality of level parcel data items for which a scale factor is small and different is constituted by an upper-level parcel file as a single file,
 at least one of the plurality of the level parcel data items for which a scale factor is large is constituted by a plurality of lower-level parcel files, and
 the version information is for the upper-level parcel file and each of the lower-level parcel files,
wherein in a case where a predetermined condition is established, the second CPU updates the plurality of level parcel data items, for which a scale factor is small and different, all at once by updating the upper-level parcel file stored in the memory based on the version information of the upper-level parcel file, and
wherein in a case where the vehicle enters one mesh of a map, the second CPU updates a lower-level parcel file stored in the memory corresponding to a mesh at a periphery of the one mesh by the version information based on information received from the first CPU.

6. The map data management system according to claim 5, wherein the second CPU of the in-vehicle apparatus is configured to
 in a case where the vehicle enters one mesh of a map, with respect to a file corresponding to a mesh at a periphery of the one mesh, receive, from the first CPU, difference data showing a difference between a file which the memory stores and a latest version of a file, and update a file based on the difference data that is received.

7. The map data management system according to claim 5, wherein
 in a case where the vehicle enters one mesh, the second CPU of the in-vehicle apparatus updates a file corresponding to a mesh at a position that corresponds to a travelling direction when the vehicle enters the one mesh.

8. The map data management system according to claim 7, wherein
 in a case where the vehicle enters one mesh, the second CPU of the in-vehicle apparatus updates a file corresponding to a mesh that contacts a side which faces a side that the vehicle passes through in the one mesh.

9. The map data management system according to claim 8, wherein
 in a case where the vehicle enters one mesh, the second CPU of the in-vehicle apparatus updates a file corresponding to a mesh that contacts a side which faces a side that the vehicle passes through in the one mesh and a file corresponding to a mesh which is contiguous to the mesh.

* * * * *